United States Patent [19]
Lin

[11] Patent Number: 6,125,379
[45] Date of Patent: Sep. 26, 2000

[54] PARALLEL VLSI SHIFT SWITCH LOGIC DEVICES

[75] Inventor: Rong Lin, Geneseo, N.Y.

[73] Assignee: The Research Foundation of State University of New York, Albany, N.Y.

[21] Appl. No.: 09/022,248

[22] Filed: Feb. 11, 1998

[51] Int. Cl.$^7$ ....................................................... G06F 7/52
[52] U.S. Cl. .......................................... 708/627; 708/625
[58] Field of Search ............................. 708/620, 625–627, 708/706

[56] References Cited

U.S. PATENT DOCUMENTS

| | | | |
|---|---|---|---|
| 5,148,388 | 9/1992 | Parmar et al. | 708/706 |
| 5,187,679 | 2/1993 | Vassiliadis et al. | 708/706 |
| 5,303,176 | 4/1994 | Hrusecky et al. | 708/627 |
| 5,426,598 | 6/1995 | Hagihara | 708/627 |

Primary Examiner—Tan V. Mai
Attorney, Agent, or Firm—Salman & Levy

[57] ABSTRACT

A new logic with shift switches incorporating novel parallel compressors and counters called C4 and (7,3) families. This shift switch logic deals with modulo arithmetic operations. It employs a type of special digital signals, called state signals (as a major addition to the binary signals), and a set of electronic components, called shift switches, to manipulate such signals and conduct the logic operations. A useful modulo arithmetic produces two values: a remainder and a quotient, given two small (non-negative) integers. One integer is a variable numerator represented by a set of input digital signals (including regular and/or state signals), while the other is a dominator (base or radix) provided by the shift switch circuit as a parameter. Using C4 and (7,3) devices, two novel, parallel-structured, full array, 64×64 floating point multiplier schemes are disclosed.

22 Claims, 32 Drawing Sheets

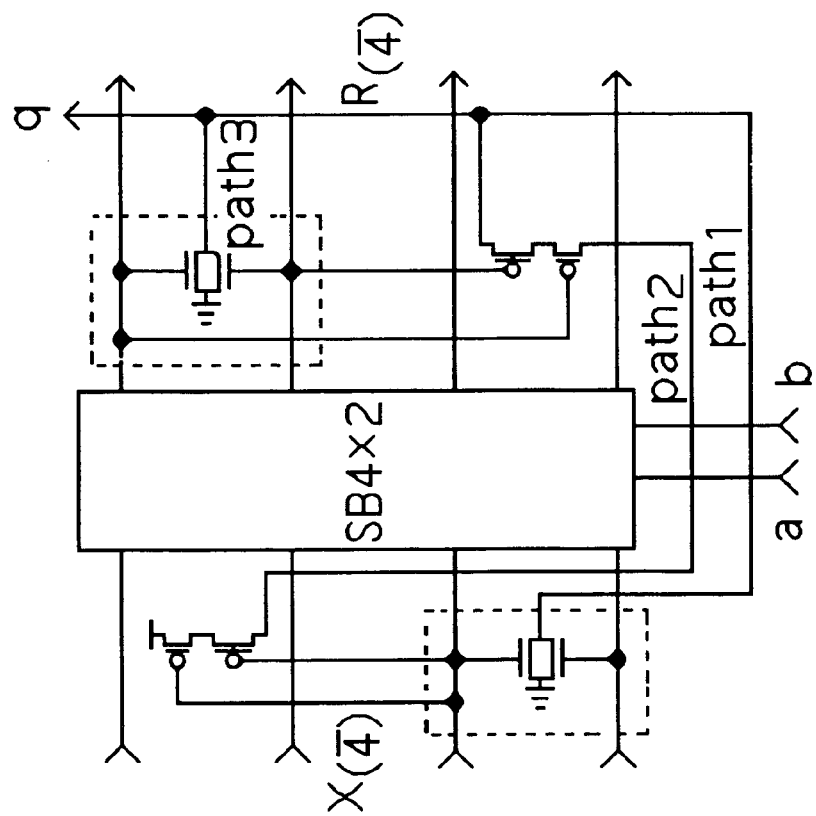
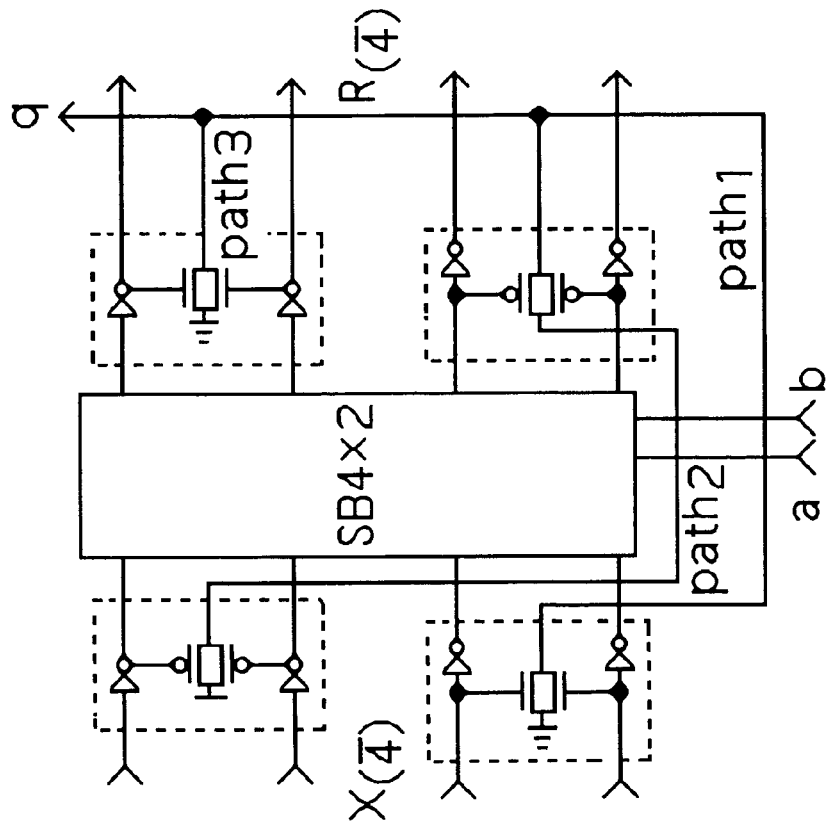
Figure 6b
Figure 6a

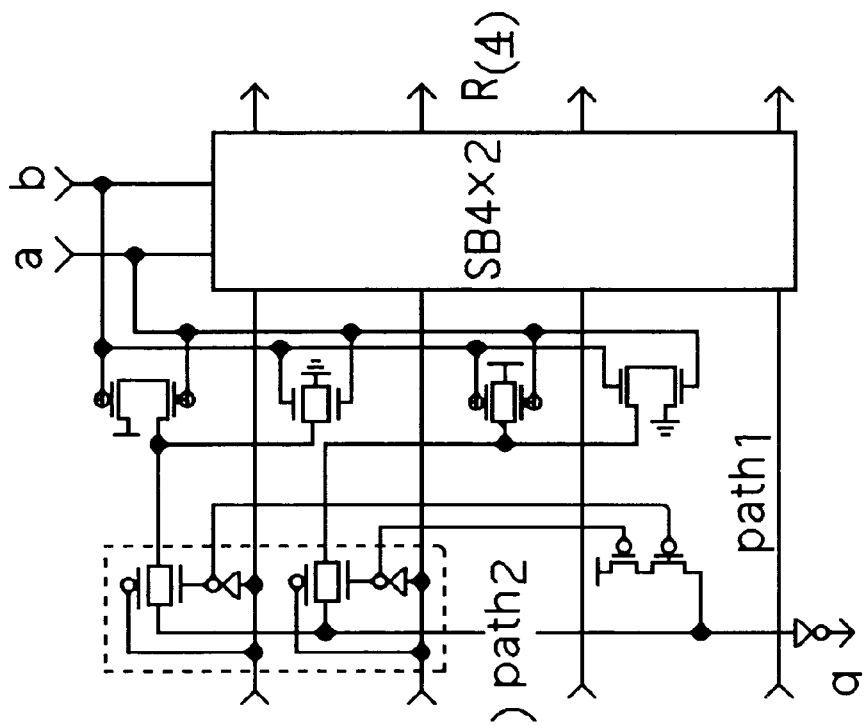
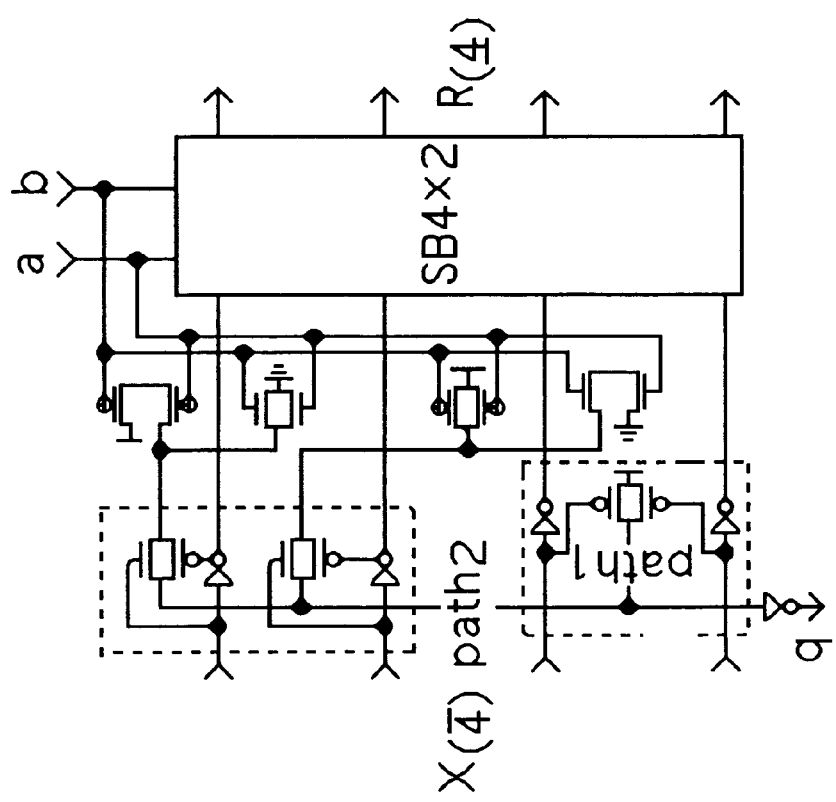
Figure 8b
Figure 8a

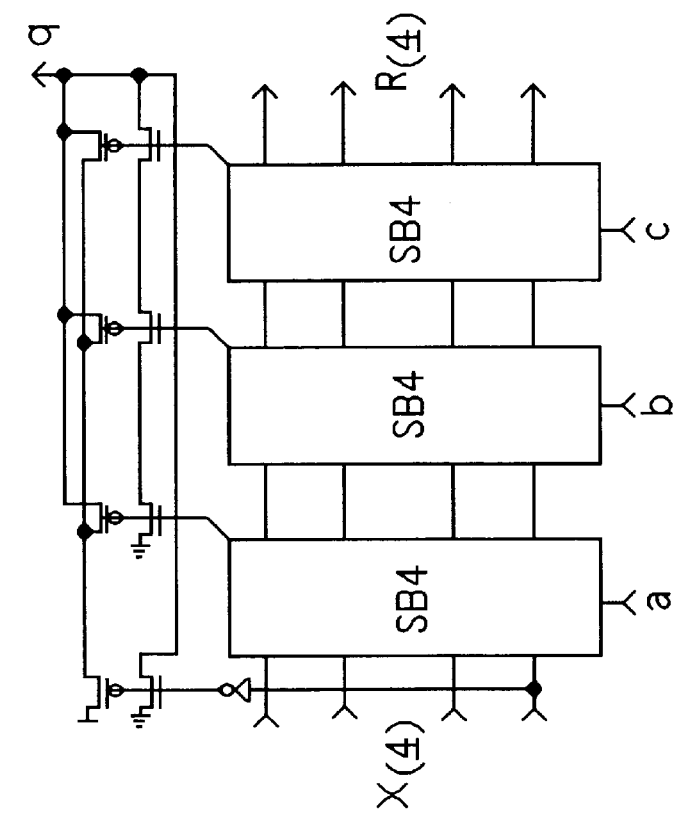
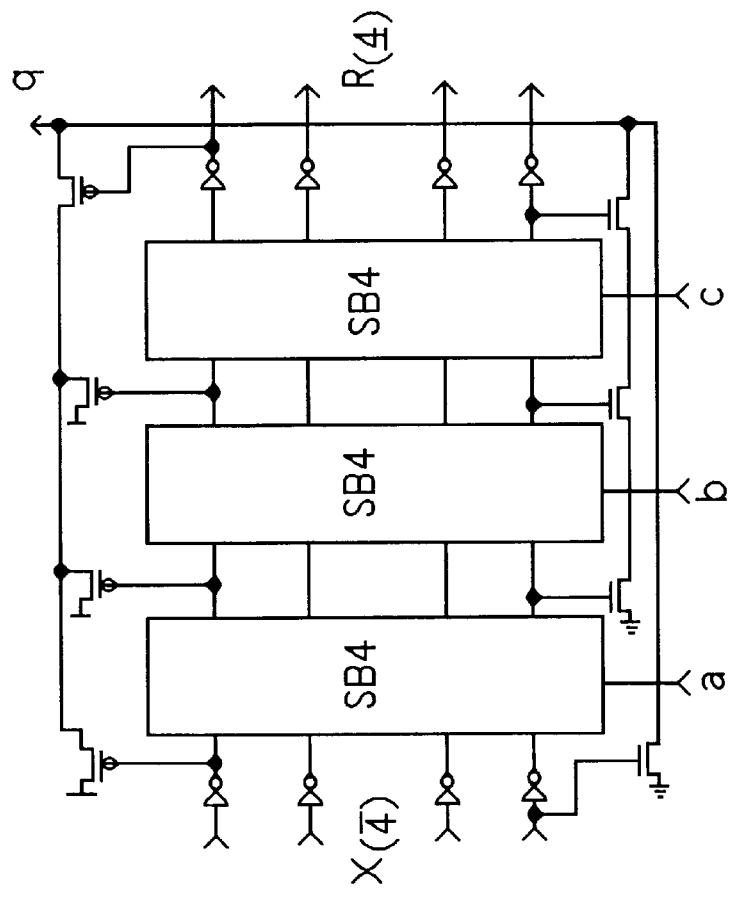
Figure 10b
Figure 10a

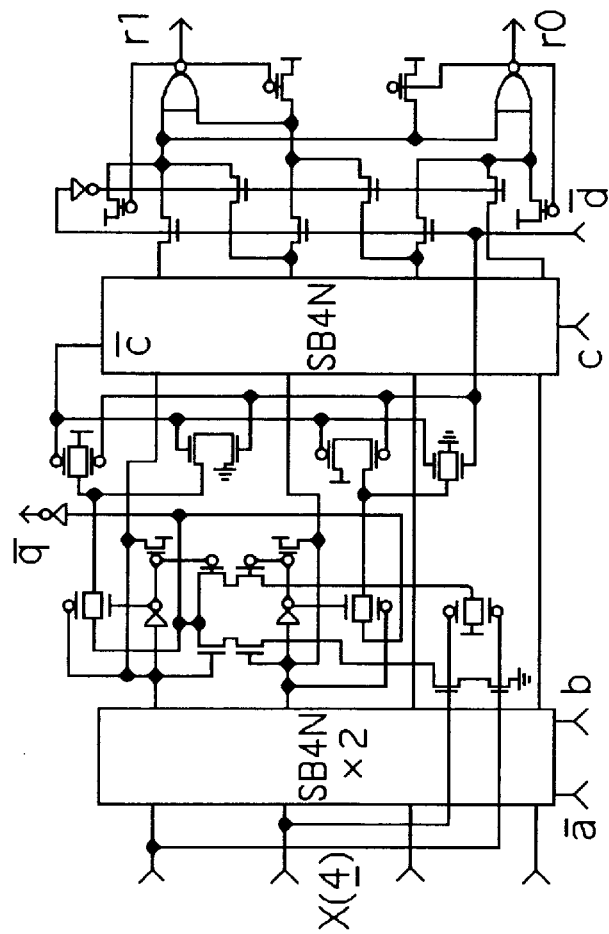
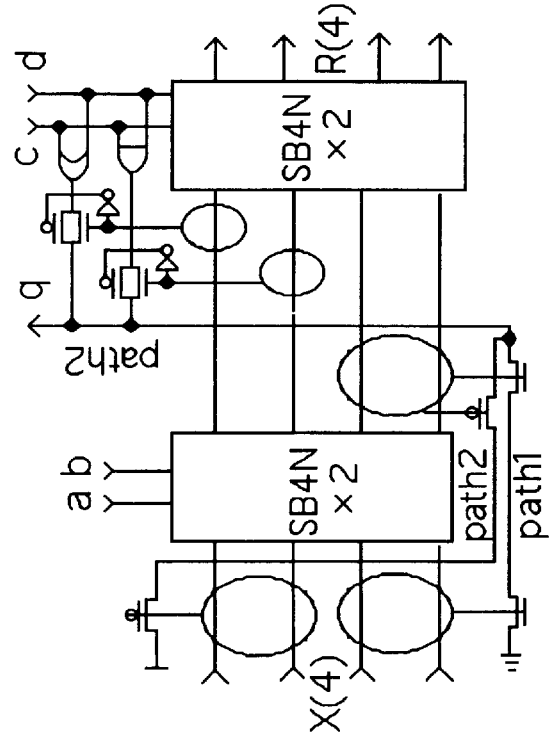
Figure 12b
Figure 12a

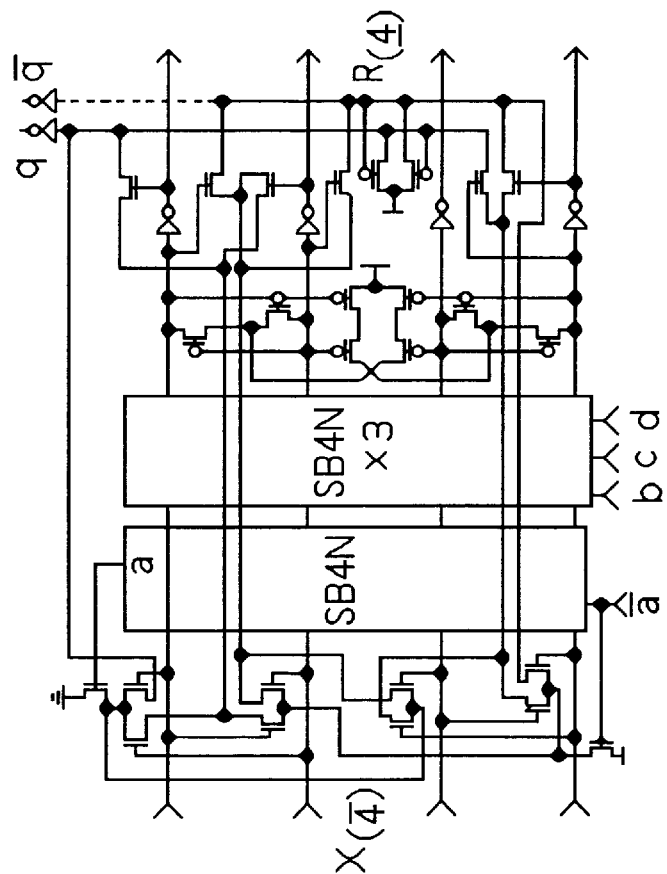
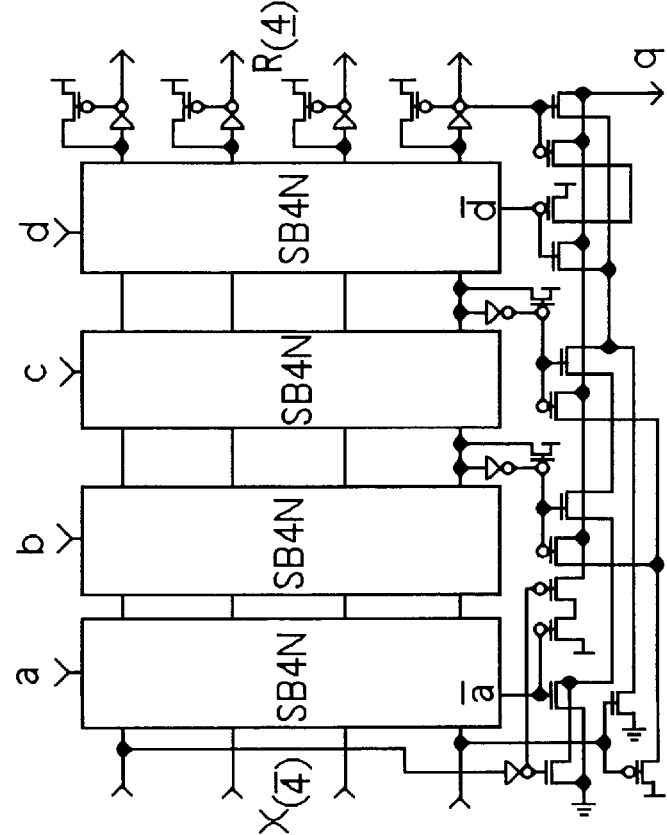
Figure 13c
Figure 13b

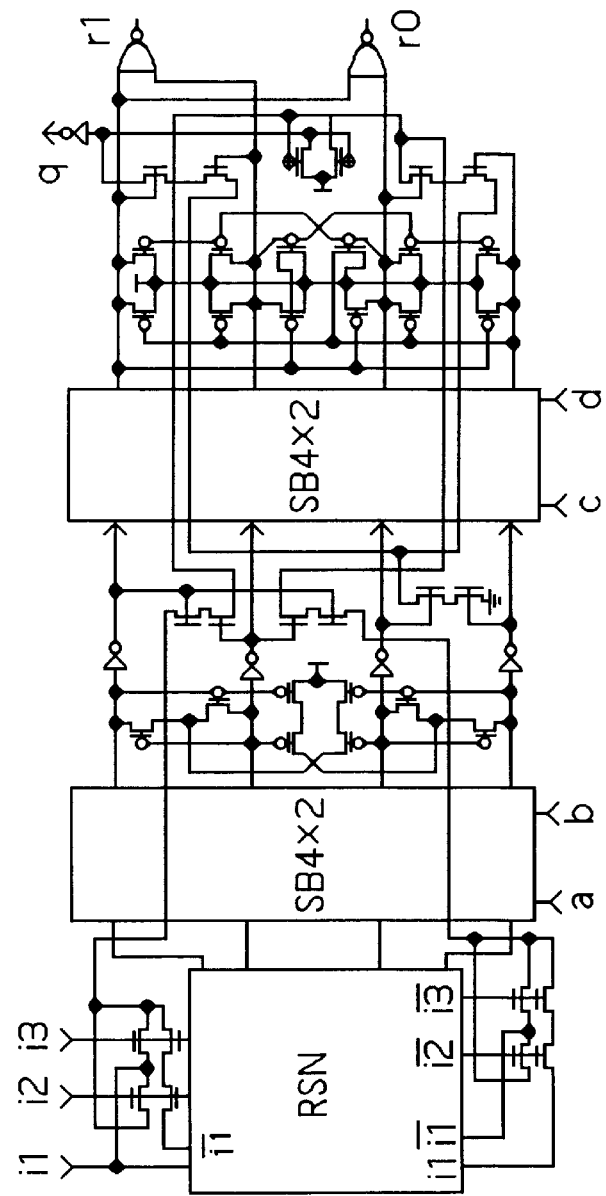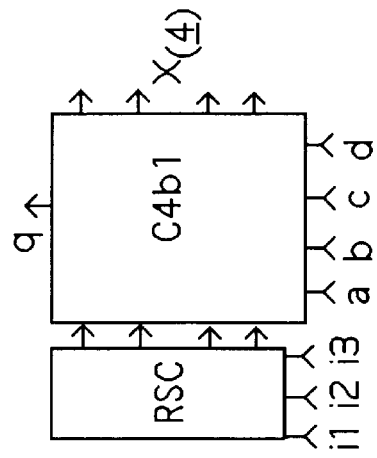
Figure 17a
Figure 17b

PARALLEL VLSI SHIFT SWITCH LOGIC DEVICES

BACKGROUND OF THE INVENTION

The present invention relates generally to switch logic and, more particularly, to VLSI arithmetic parallel counters, binary partial product reduction trees, and parallel structured full array multiplier schemes.

Modulo arithmetic operations, which produce a remainder and a quotient, also called carrys, given two small integers, are the basis for formation and representation of the most important number systems such as binary and octal. In the prior art, remainders and quotients were represented by binary signals. The logic of this invention employs types of signal, called state signals, in addition to the binary signals. The aforementioned operations, in accordance with the new logic, are implemented using novel electronic components called shift switches: C4 and (7,3) parallel counter and compressor families. The concept of the shift switches stems from the concept of dynamic reconfigurable architectures.[4–6,9]

Multiplier schemes of the prior art use full adders, such as Wallace-Dadda schemes, for the reduction of a partial product matrix. Various (4,2) and (7,3) configurations are also used.[1–3, 11–19, 21] They typically reduce a partial product matrix into two binary numbers.

It would be advantageous to provide a multiplier scheme that employs only shift switch devices with C4 and C4 based (7,3) families as building blocks.

It would also be advantageous to provide such a scheme to reduce the partial product matrix into a binary number and a number represented by a sequence of state signals.

It would further be advantageous to provide such a scheme with VLSI architecture that is highly regular and modular with repeatable interconnection structures, one in binary tree form and the other in linear array form.

It would also be advantageous to provide such a scheme that is fast, requires a compact VLSI area, and dissipates less power.

SUMMARY OF THE INVENTION

In accordance with the present invention, a new logic is provided with shift switches, called shift switch logic. The logic deals with the modulo arithmetic operations which are fundamental to digital signal processing and modern computer arithmetics, employing a type of signal (state signal) as a major addition to binary signals.

Modulo arithmetic operations are implemented by electronic components called shift switches. Compared with the traditional pure binary switching logic implementations of modulo operations, the inventive logic has several advantages: (i) the modulo operations are simpler in terms of both the number of logic steps and circuit realizations; (ii) the degrees of regularity and the locality for application circuits are higher; (iii) the system is suitable for very high speed CMOS implementation, and the critical paths contain only the fastest VLSI devices, such as nMOS pass transistors, transmission gates, inverters, and two-input-NAND gates. Moreover, the logic is enhanced with innovative features for parallel digital signal processing and VLSI arithmetic.

Novel shift switch implementations are described herein as a set of parallel compressors and counters, C4 and C4-based (7,3) families. A C4 circuit is functionally equivalent to a traditionally defined (6,3) parallel counter. It reduces six effective input bits into three bits, consequently replacing one and a half (4,2) configurations or three full adders in arithmetic applications (typically in partial product matrix reductions). C4 circuits possess the following features, which, when viewed as a whole, make C4 circuits superior to their counterparts (i.e., traditional (4,2) and full adders) :[3, 11, 15, 21, 22]

(1) nearly minimal transistor counts;
(2) minimal VLSI area due to the low transistor count and the high regularity (in near matrix form);
(3) no in-stage interconnection in contrast to (4,2) configurations and minimal inter-stage connections;
(4) high speed due to fewer logical stages which are required from input to output. The critical path of a C4 circuit contains only one or two inverters and four pass-transistors with one signal restoration: the maximal inverter fanout is no more than 4.5. In contrast, the critical path of a (4,2) configuration requires more logical stages plus an in-stage cross column signal delay which degrades the circuit performance, particularly for larger size matrix reductions; and
(5) lower power dissipation. There are two major problems associated with traditional complementary pass-transistor logic ((CPL[21]) with fast differential stages) techniques: significant short circuit current may be produced by pMOS pull-up transistors, and large wiring overhead is required. In the C4 circuits, the short circuit current is significantly reduced through the use of N-type state signal of width 4 where three out of four signal bits have values 0. There is only a 25% possibility to produce such current in the novel C4, in contrast to traditional CPL circuits where there is a 50% possibility.[21] The large wiring overhead problem does not exist in the aforementioned C4 circuits which reduce circuit capacitance and power dissipation. The C4 circuits employ a single, rather than double input/output signal rail.

The circuit structure of these elementary arithmetic devices all possess critical paths whose structure is an array of cascaded shift switches with buffers embedded, where a state signal is repeatedly (cyclically) shifted and inverted. These constructed devices reduce the complexity and improve the speed and area compactness for the circuits which are used as building blocks for digital designs.

Elementary arithmetic operations such as count, compress, compare, add, and multiply are processed in novel ways by incorporating the C4 and (7,3) devices. In particular, using the inventive devices, a unique binary partial product reduction tree structure and two parallel-structured, full array, 64×64 floating point multiplier schemes are disclosed.

Binary tree based partial product reduction is widely recognized as the best choice for high-speed, low-power, VLSI compact multiplier designs. Prior to this work, there was only one such tree,—the (4,2) tree—in use. With the C4 counters of the present invention, new binary partial product reduction networks called C4 trees now can be more efficiently formed, which show advantages over the (4,2) binary trees for regular tree multiplier designs.

The novel multiplier schemes of this invention do not use full adders for the reduction of a partial product matrix. Almost all existing, well-known multipliers, including Wallace-Dadda schemes and (4,2) and (7,3) families, are full adder based. Shift switch devices with (7,3) and C4 families as building blocks are used instead. They do not reduce a partial product matrix into two binary numbers, but rather, reduce it into a binary number and a number represented by a sequence of state signals. The process is simpler than the traditional process, while being equally effective in terms of speed and VLSI area for the final addition operation, which produces the product of the multiplication. The system has highly regular and modular VLSI architectures with repeatable interconnection structures, one in binary tree form and the other in linear array form. The structure is not only fast, but requires a compact VLSI area, with a total transistor count close to the minimal ones known today.

Accordingly, it is the objective of the logic to provide simpler modulo arithmetic operations, compared with binary logic, in terms of both the number of logic steps and circuit realizations.

Another objective of the logic is to provide a high degree of regularity and the locality for application circuits. A further objective of the logic is the suitability for high speed CMOS implementation, relying on only the fastest and lowest power CMOS devices.

The new logic accordingly comprises the features of construction, combinations of elements, and arrangement of parts which will be demonstrated in the constructions hereinafter set forth, and its scope will be indicated in the claims.

BRIEF DESCRIPTION OF THE DRAWINGS

For a fuller understanding of the invention, refer to the following description taken in connection with the accompanying drawings, in which:

FIG. 1a represents the state signal $0_{(4)}$ in accordance with the logic of the present invention;

FIG. 1b represents the state signal $1_{(4)}$ in accordance with the logic;

FIG. 1c represents the state signal $2_{(4)}$ in accordance with the logic;

FIG. 1d represents the state signal $3_{(4)}$ in accordance with the logic;

FIG. 1e represents the state signal $5_{(8)}$ in accordance with the logic;

FIG. 1f represents the state signal $0_{(2)}$ or $1_{(2)}$ in accordance with the logic;

FIG. 1g represents the state signal $1_{(2)}$ or $0_{(2)}$ in accordance with the logic;

FIGS. 6a, 6b, and 6c are the CMOS implementation of cell C(w/2)a for w=4 (denoted by C2a);

FIGS. 8a and 8b are the CMOS implementation of cell C2b;

FIGS. 10a, 10b, 10c, 10d, and 10e are the CMOS implementation of C3c=C(w−1)c for w=4;

FIGS. 12a, 12b, and 12c show shift switch unit C4b constructed by two of C2b and its CMOS pass-transistor-logic implementations using C2b of FIG. 8;

FIGS. 13a, 13b, 13c, 13d, 13e, are shift switch unit Cwc constructed by the extension of Ckc k=w−1;

FIGS. 17a, and 17b, show a (7,3) counter-compressor family (two (7,3), a (6,3) and a (5,3), respectively);

DETAILED DESCRIPTION OF THE PREFERRED EMBODIMENTS

Figure 2:
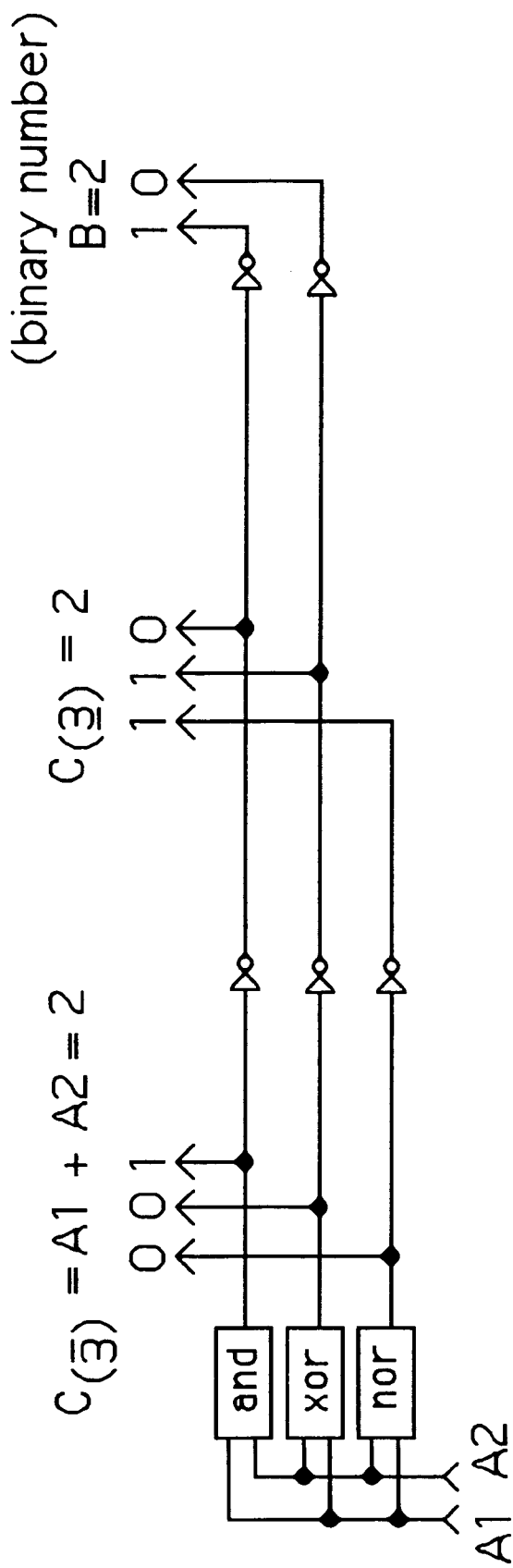
FIG. 2 is a circuit illustrating the signal conversions from regular/state to state/regular and inversion of state signals in accordance with the logic.

The logic of the present invention relates to switch logic for VLSI arithmetic parallel counters, binary partial product reduction trees, and parallel structured full array multiplier schemes. The logic employs types of signals, called state signals, in addition to binary signals. Using C4 and (7,3) devices, two novel, parallel-structured, full array, 64×64 floating point multiplier schemes are herein described.

A w-bit state signal (w being the width or bandwidth of said state signal) with an integer value i, where $0 \leq i \leq w-1$ and $w \geq 2$ is represented by the bit sequence $b_o, b_1, \ldots, b_{w-1}$ with the unique bit u (either 0 or 1) in the $i^{th}$ position. The orientation of bit sequence is assumed left to right or bottom up unless otherwise specified as per this logic. A state signal of the n− (p−) type is denoted by $I_{(w)}$ (or $\bar{I}_{(w)}$) if u=0 (1) as illustrated in FIG. 1. A w-bit state signal may be denoted by $I_{(w)}$ regardless of type, or simply I or i. State signal $I_{(w)}$ is, in fact, a decoded form of a binary number I.

Referring now to FIG. 1, the inverse of w-bit state signal I is represented by Ī with each of its bits being inverted. The inversion does not change the value of a state signal because its unique point remains unchanged. The inverse of $\bar{I}_{(2)}$ (or $\bar{I}_{(2)}$) can be interpreted either as $\bar{I}_{(2)}$ (or $\bar{I}_{(2)}$), or as $I_{(2)}$ (or $I_{(2)}$). The circuits can be interpreted such that inverting a state signal always means inverting its type and not changing its value; furthermore, its value can be changed only by shift switches.

Given a state signal $X_{(w)}$, called shift-in, and a set of regular and/or two-bit state signals Y, called shift controls, a modulo shift switch, denoted by S<w, Y, Q> realizes function $F(X_{(w)}, Y)=(R_{(w)}, Q)$ where w is called the width of the switch, output R and Q are called shift-out (or remainder) signals and quotient set, respectively, and for a function F, Equation 1 holds:

$$X + \Sigma Y = w^* \Sigma Q + R \qquad (1)$$

where X and R are the values of the shift-in and shift-out state signals, respectively, ΣY and ΣQ are the weighted sums of values for all control signals in Y and all quotient signals in Q, respectively. Parameter w and the number of signals in Y and Q, as well as the types of these signals, are physical parameters. It must be assumed that all input signals have the same weight as X unless, for some signals in Y, otherwise stated. For example, if Y contains a and b, Q contains q and p, and b is specified with a weight k higher than X, then the explicit logic shown in Equation 1 is: $X+a+2^k b=w(q+p)+R$.

In case Q is a singular set (with a single regular signal or a binary bit); the shift switch is denoted by $S<w,Y>$. In this case, if Y consists of only a single (d+l)-bit state signal of weight k=0, then it is simply denoted by $S<w,d>$.[6] The shift switch logic (Equation 1) is independent of the types of control signals (i.e., whether regular or n/p type state signals). However, once an $S<w, Y, Q>$ is implemented, the signal types of its inputs and outputs must be fixed.

Figure 3A:
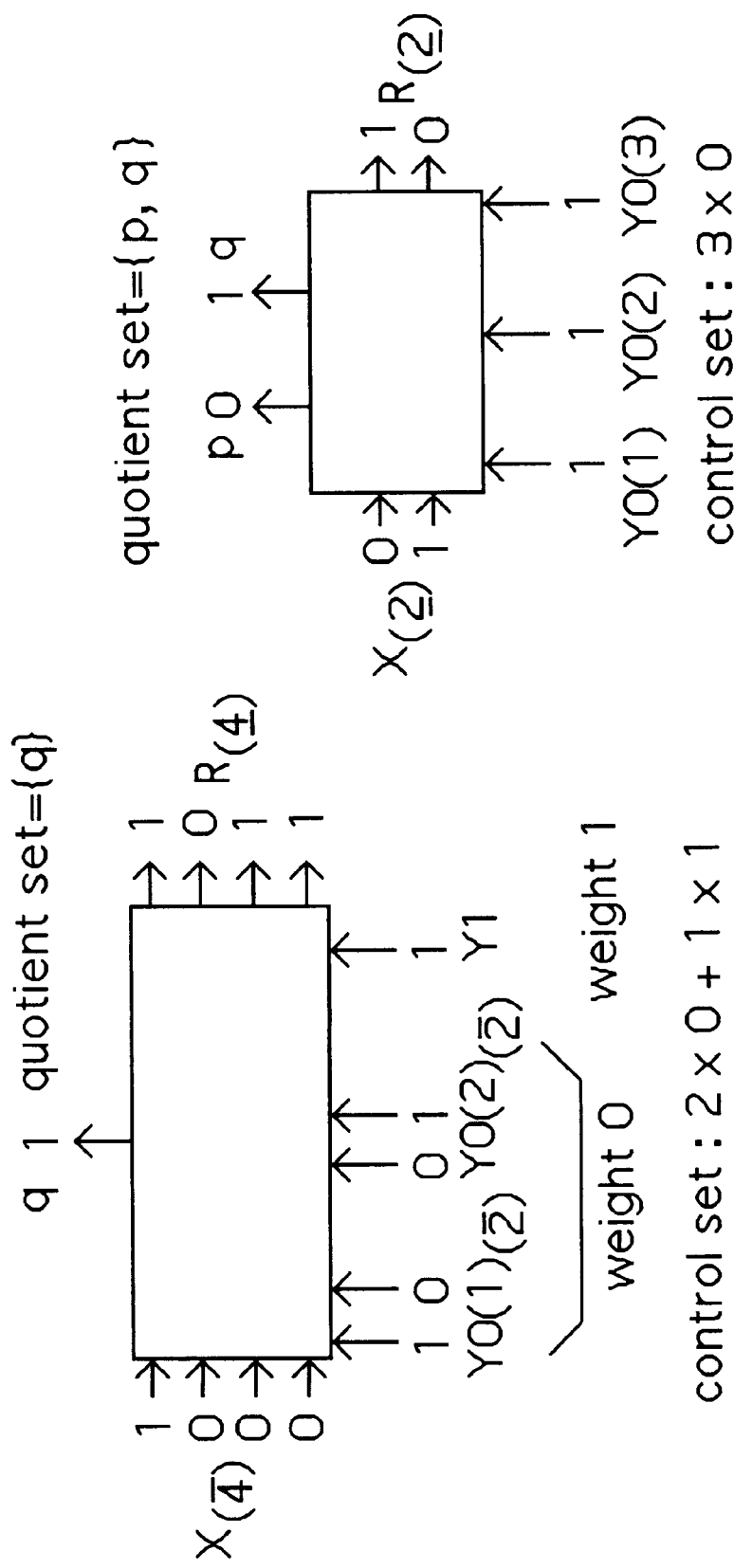
FIG. 3a illustrates the shift switches with specifications and samples in accordance with the logic.
Figure 3B:
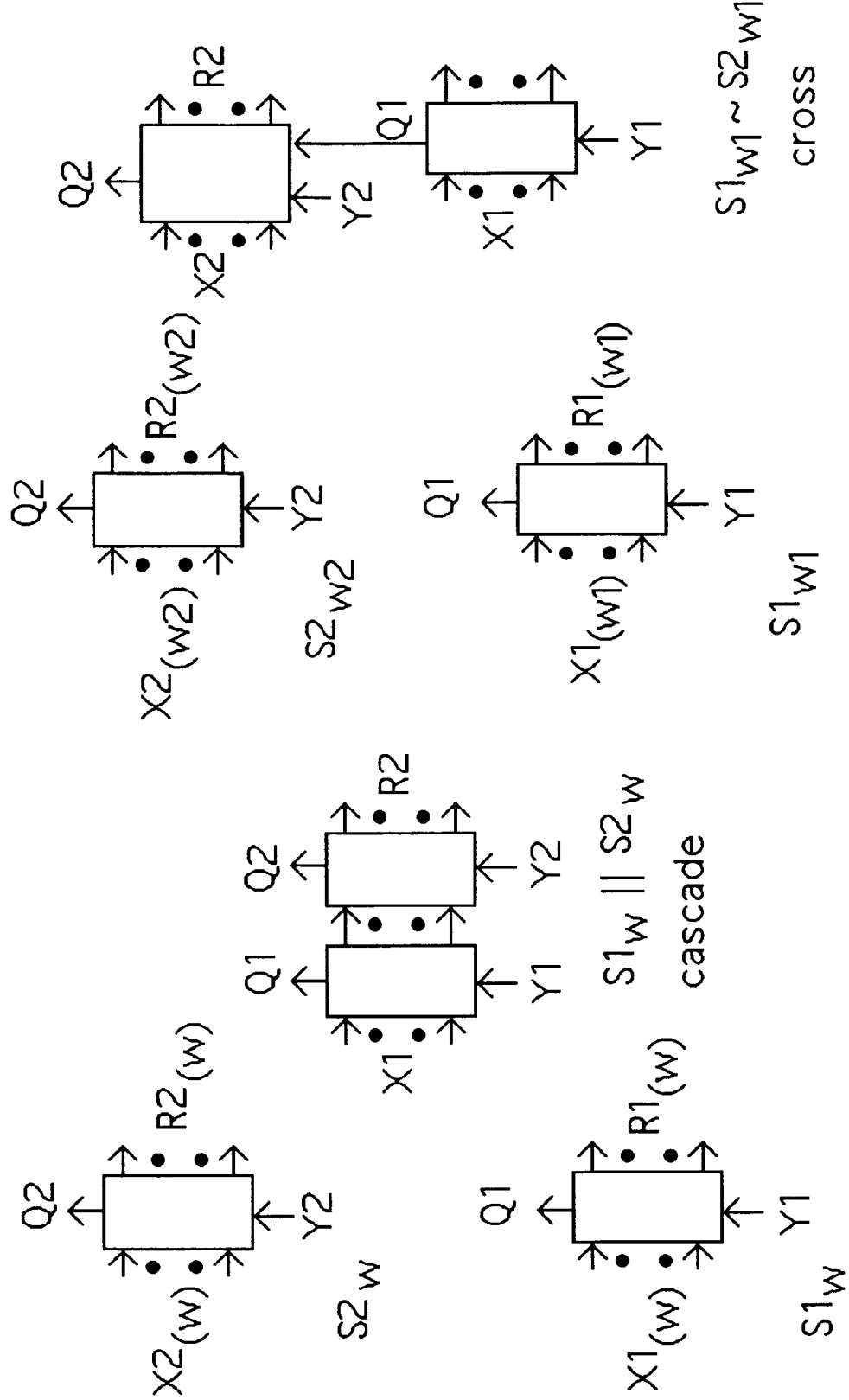
FIG. 3b illustrates two shift switch logic primitives, cascade and cross.

Referring now to FIG. 3, there is shown how a quadruple, such as $(X_{\overline{(4)}}, Y, R_{(4)}, Q)$ called a specification, may be associated to a shift switch to describe its input/output signal types if it is necessary.

As a special case, the signals contained in Y may have two weights (k=0 and 1), and can be grouped in two sets: set Y1 where the value of each signal has a binary weight 1 higher than shift-in signal X, and set Y0 where a signal has a binary weight 0 (same as X). Thus, Y may contain n signals of weight k=1 (i.e., Y1(1), Y1(2), . . . , Y1(n)), plus m signals of weight k=0 (i.e., Y0(1), Y0(2), . . . , Y0(m)). This set of Y may be expressed as (n×1)+(m×0).

In FIG. 3, the control Y of shift switch $S<4, 1\times1+2\times0>$ is composed of one control signal of weight 1 and two control state signals of weight 0, while the control Y of $S<4, 2\times0>$ is composed of only two control signals of weight 0.

The significance of shift switch logic Equation 1 is that it implies two shift switches with the same shifting signal width w, say $(X1_{(\overline{w})}, Y1, R1_{(w)}, Q1)$ and $(X2_{(w)}, Y2, R2_{(\overline{w})}, Q2)$, can be cascaded directly, with or without inverting the shifting state signal of the connection, to obtain a new shift switch. This is the first primitive operation of the logic, which can be specified as $$(X1_{(w)}, Y1, R1_{(w)}, Q1)\|(X2_{(w)}, Y2, R2_{(w)}, Q2)=(X1_{(w)}, Y1 \cup Y1, R2_{(w)}, Q1 \cup Q2) \quad (2)$$

or simply, $$S1_w \| S2_w = S3_w \quad (3)$$

where symbol ∥ denotes the logic primitive (operator), called cascade; symbol U denotes set union, and $Si_w$ (i=1, 2, 3) represents the corresponding shift switches as in Equation 2.

Another important observation is that the shift switches can be cross connected such that the resulting pair of shift switches, called $S1_w$ cross $S2_w$, denoted by $S1_w\~S2_w$, satisfies this equation:

$$X1+\Sigma Y1+w1(X2+\Sigma Y2)=w1^*w2^*\Sigma Q2+w1^*R2+R1 \quad (4)$$

Given $S1_{w1}=(X1_{(W1)}, Y1, R1_{(w1)}, Q1)$, $S2_{w2}=(X2_{(w2)}, Q2, R2_{(w2)}, Q2)$, and signal X2 has a weight Log(wl) higher than X1.

The cross operation is also called the second primitive of the logic.

An important special case of the Equation 4 is when w1=w2=w. Equation 4 becomes:

$$X1+\Sigma Y1+w(X2+\Sigma Y2)=w^2\Sigma Q2+wR2+R1 \quad (5)$$

It is straightforward to see that with a sequence of logic primitive operations such as cascade and cross as well as conversion between binary signals and state signals, a k-tree shape network, or a k-branch tree for k≦w, can be constructed. This network reduces sets of control input bits and a set of shift signals into a set of remainders in the form of state signals, associated with different binary weights. The resulting signals are usually composed of significantly fewer items. In typical cases, the value k can be 2, when a half number of state signals produced at each stage of the network is encoded and the other half remains unchanged (as shifting signals). This leads to a binary tree reduction network. Therefore, in a general sense, the new logic has provided effective tools for performing modulo arithmetic operations in a unique form.

The logic is practical and efficient to implement various VLSI arithmetic applications.

With the availability of the logic primitive, all that is needed is to define the following few, simple shift switches, called cells.

Referring now to FIGS. 6, 8, and 10, shown are CMOS pass-transistor based implementations of these basic shift switch circuits. Unique properties of state signals and the switch cells, which is the foundation of the logic and its applications, are also illustrated.

A shift switch cell is a shift switch $(X_{(w)}, Y, R_{(W)}, Q)$ where $\Sigma Y \leq W-1$. The implementation of any shift switch is for the computation of R and Q; however, for a switch cell, only a singular set Q needs to be handled. It can be represented by only one binary bit, say q. This is because X<w and $\Sigma Y \leq w-1$, from Equation 1, $\Sigma Q \leq 1$. State signals and switch cells have four properties which can be utilized for efficient implementations of the switches. A type of switch cells, whose Y contains no more than w/2 bits (each with a weight k=0), is particularly interesting to the new logic.

Property 1: evaluate R. given X and Y

In modulo (w) arithmetic, to add integer y (y ≦0) and state signal $X_{(W)}$ is equivalent to cyclically shifting $X_{(w)}$ y bits along its orientation. The resulting state signal is their modulo sum. Property 1 is derived directly from the state signal definition.

Figure 4A:
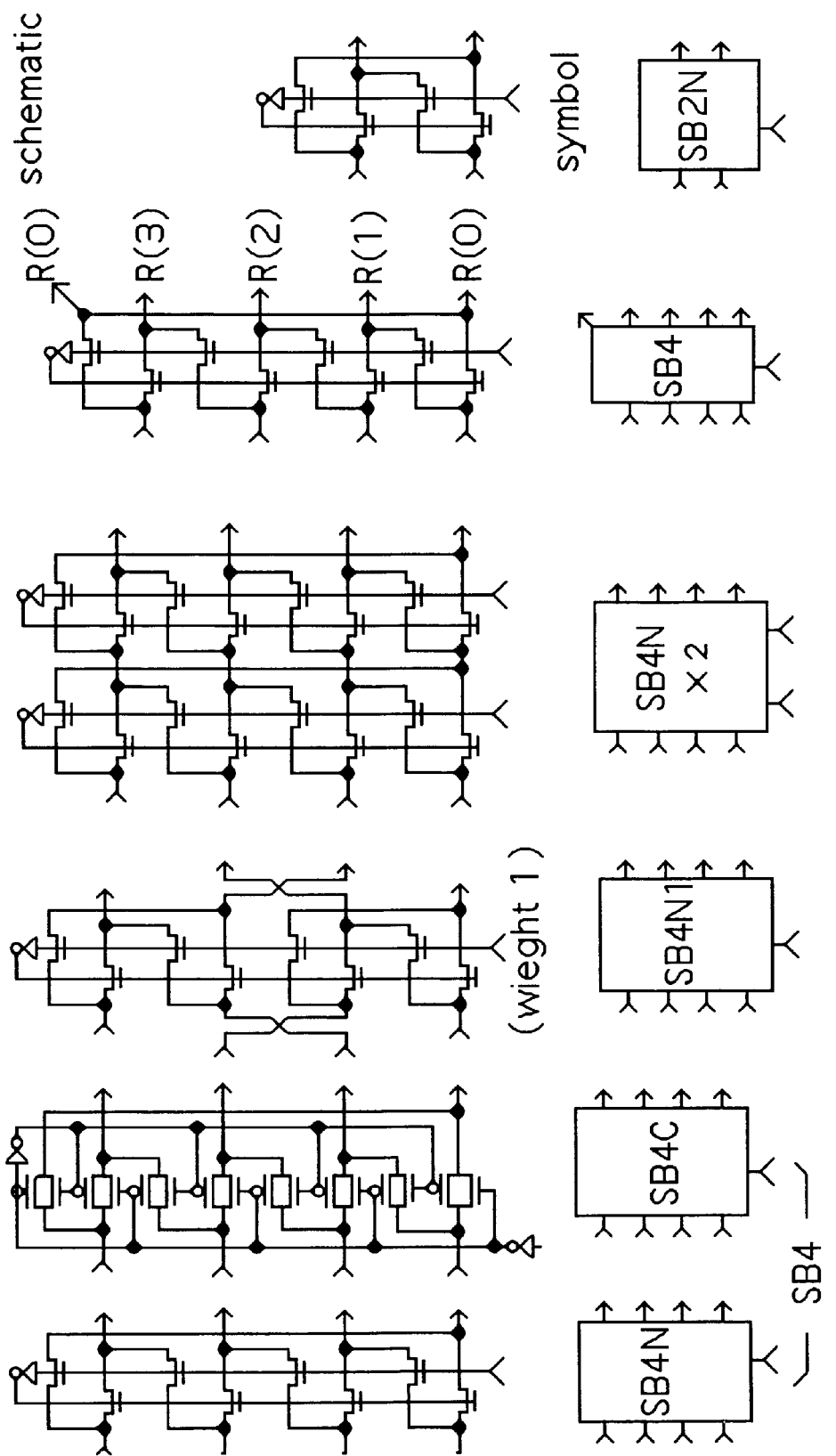
FIGS. 4a and 4b define shift-bar circuits and show the property 1 of state signals in accordance with the logic.
Figure 4B:
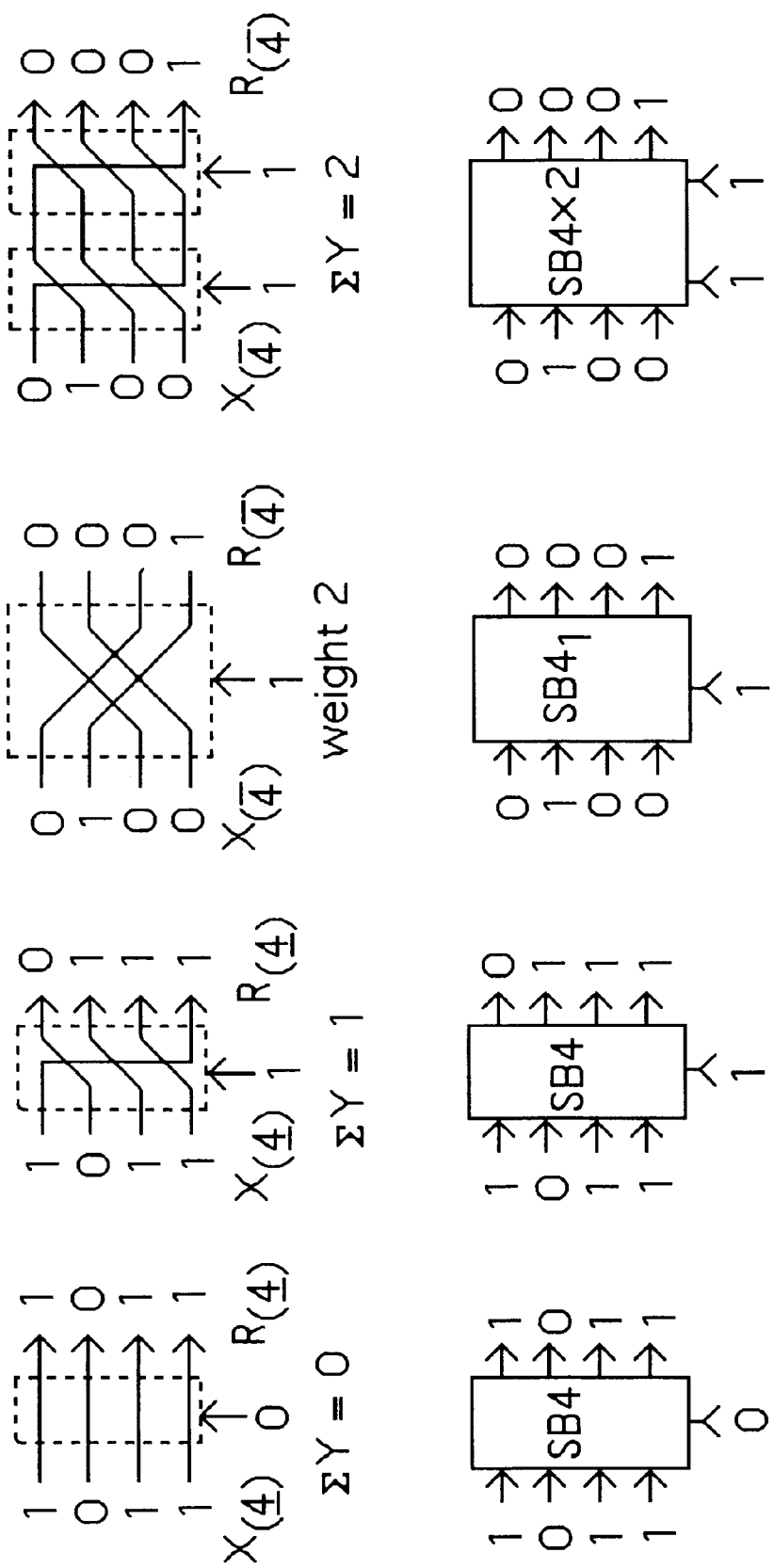

Referring now to FIG. 4, illustrated is the property and CMOS circuit implementation of R. The circuits called shift-bars cyclically shift the shift-in by y bits to produce R. SBCw and SBNw are used to denote shift-bars composed of transmission gates (or complementary switch) and nMOS transistors respectively for shifting state signal of width w. SBw may be used simply for a shift-bar of width w regardless of its composition, and may be followed by x k to denote k such shift-bars cascaded. The shift-bars illustrated here have some circuit details omitted such as signal (voltage level) swing restoration when a signal 1 passing nMOS transistors, and are later referred to in FIGS. 6c and 10c.

Property 2: evaluate g in general, given X and R

For a shift switch cell with Y containing no more than w/2 control signals the following holds:

$q = 0$ if $X < w/2$ OR $R > w/2$ $q = 1$ if $X > w/2$ and $R \leq w/2$

Figure 5:
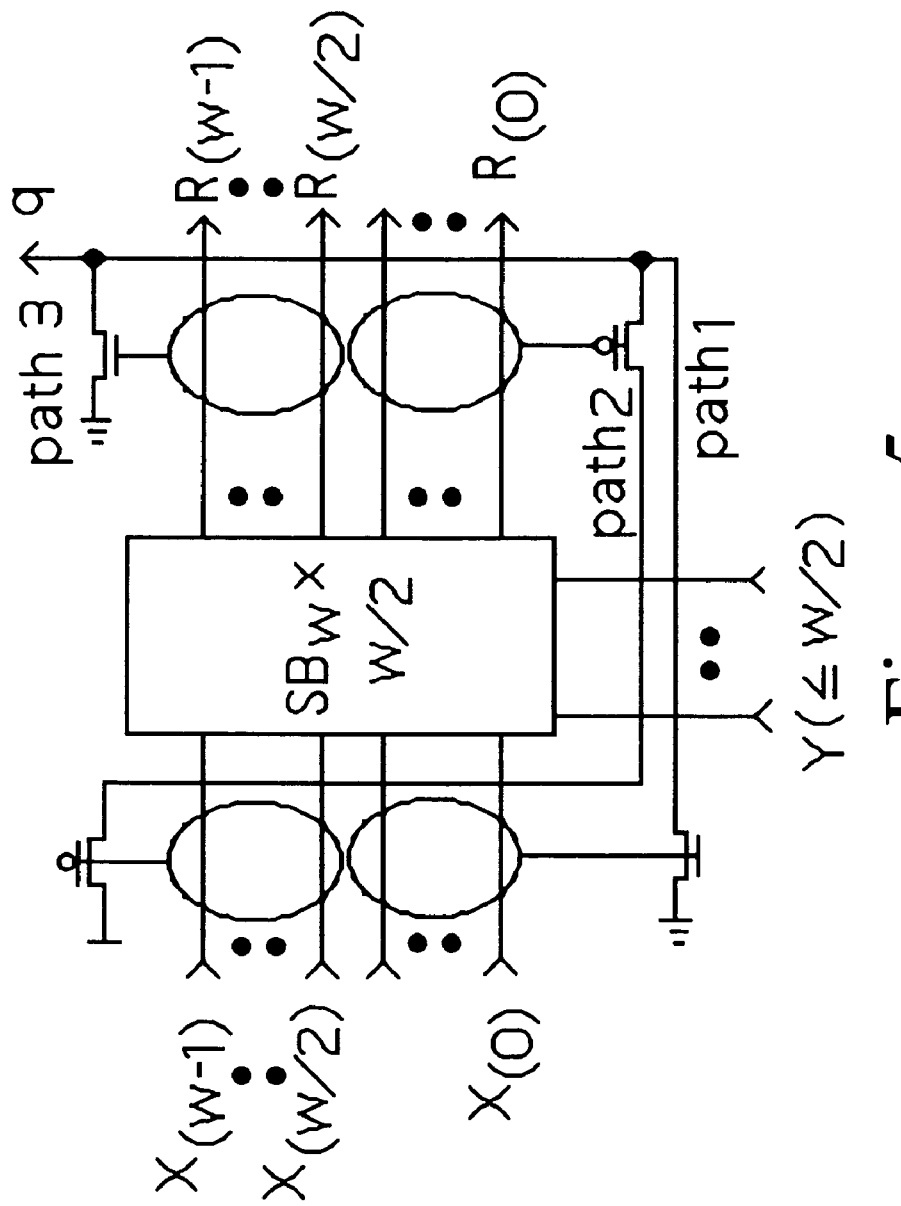
FIG. 5 is the block diagram of CMOS shift switch (denoted by C(w/2)a) constructed based on property 2.

Referring now to FIG. 5, illustrated is a general shift switch cell, called C(w/2)a. The vertical line out from a circle represents a control bit produced from each bit of shifting signal within the circle, such that the controlled transistor is on if and only if the shifting bit is a unique bit. When X<w/2, the unique bit u of X should be in the bottom circle; consequently, a 0 is sent to q through path 1. At the time, all transistors in the top circle of X are open since bit u is not present; therefore, path 2 is not connecting the source or drain to q. Similarly, if R≧w/2, a 0 is sent to q from path 3. When X≧w/2 and R<w/2, the u bit of X is at the top circle of X and the u bit of R is in the bottom circle of R, a 1 is sent to q through path 2.

Referring now to FIG. 6a, shown is a CMOS implementation of a shift switch cell ($X_{(4)}$, (a,b), $R_{(4)}$, q), called C(4/2)a or C2a. In the figure, C stands for counter or compressor; 4/2 or 2 represents the number of control signals or the maximal value of $\Sigma Y$; letter a designates the type of implementation. It is straightforward to verify the correctness of the circuit.

Figure 6C:
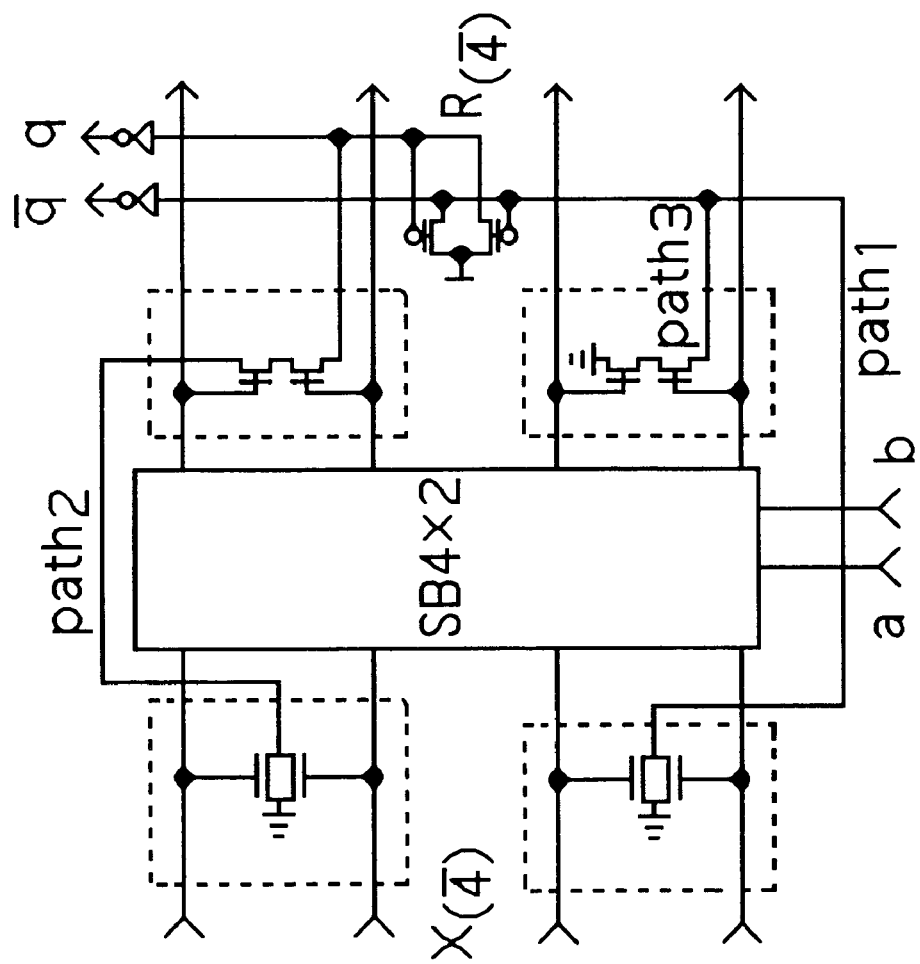

The implementation can be modified such that vertical control bits may be produced from only two circles (FIG. 6b), one from the left of the shift-bar (any of the two), the other from the right (any of the two). FIG. 6c shows a modified complementary pass transistor logic[14, 21] (CPL) implementation of the switch cell. The q evaluation paths produce only 0 signals for exactly one of q or $\bar{q}$ (q's complement), while the missing one (i.e., not produced bit) is restored by pMOS pull-up transistor.

Property 3: evaluated q assuming w=4, given $X_{(4)}$ and Y=(a,b)

For shift switch cell ($X_{(4)}$, (a, b), q, $R_{(4)}$) the following holds:

$$q = 0 \quad \text{if } X < 2$$
$$q = a \text{ AND } b \quad \text{if } X = 2$$
$$q = a \text{ OR } b \quad \text{if } X = 3$$

Figure 7:
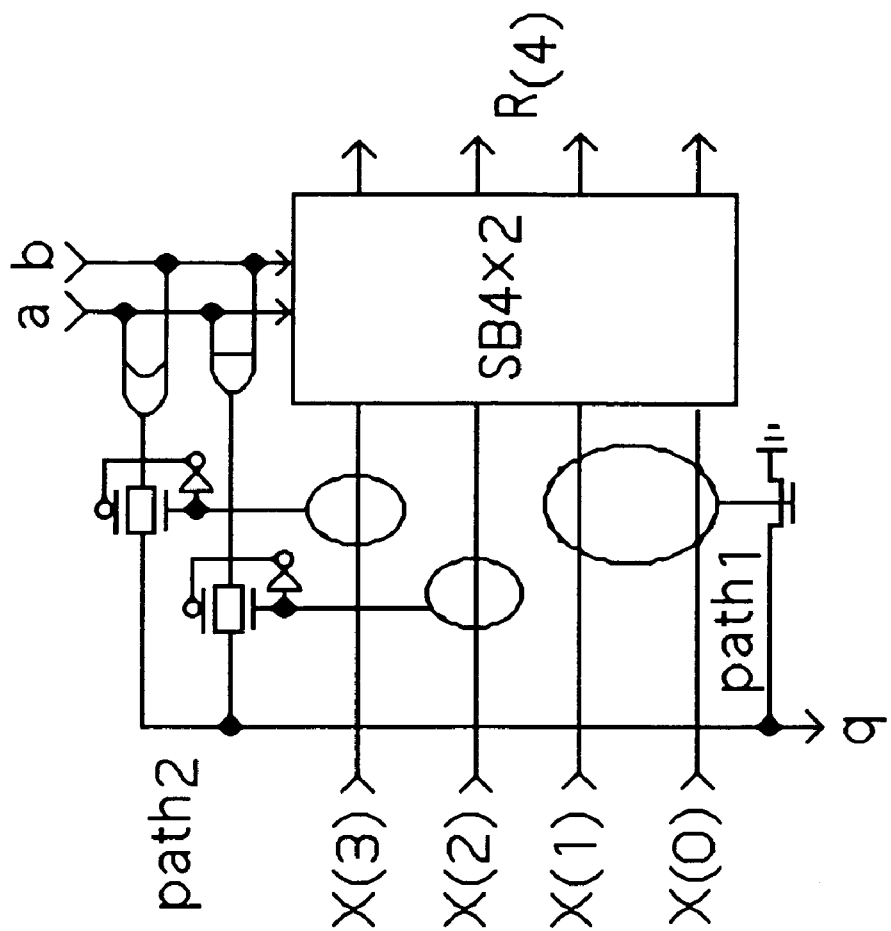
FIG. 7 is the block diagram of CMOS shift switch cell C2b constructed based on property 3.

FIGS. 7 and 8a illustrate the block diagram and CMOS implementation of an alternative shift switch cell C(4/2)b (C2b), similar to the switch cell shown in FIGS. 5 and 6. When X<2, the unique bit u of X is in the bottom two lines, and a 0 signal will be sent to q through path 1, so path 2 does not connect the source or drain to q. All transistors controlled by the top two lines of X are open, due to bit u not being present. When X=2, the u bit of X is in line X(2), the logical AND of a, b will be sent to q through path 2. Similarly, when X=3, the logical OR of b will be sent to q through path 2.

The implementation can also be modified to obtain vertical control bits from only one indicated circle (FIG. 8b).

Property 4: given Xh(0) and Xh(0), Xh(w−1) for all $0 \leq h \leq k$

For a shift switch cell with Y containing k<w binary signals, let the k control signals (i.e., Y1, Y2, ..., Yk), which shift the passing state signals (with the initial shift-in of X0), produce a sequence of k state signals: X1, X2, ..., Xk(=R). The following holds:

$$q = 0 \quad \text{iff } X0 = 0 \text{ or all } Xh = 0 \quad 1 \leq h \leq k$$
$$q = 1 \quad \text{iff there exists an } Xg = w-1 \ (0 \leq g < k) \text{ and } Xk \neq w-1$$

Each control bit Yi in Y has the same weight as X0.

Figure 9:
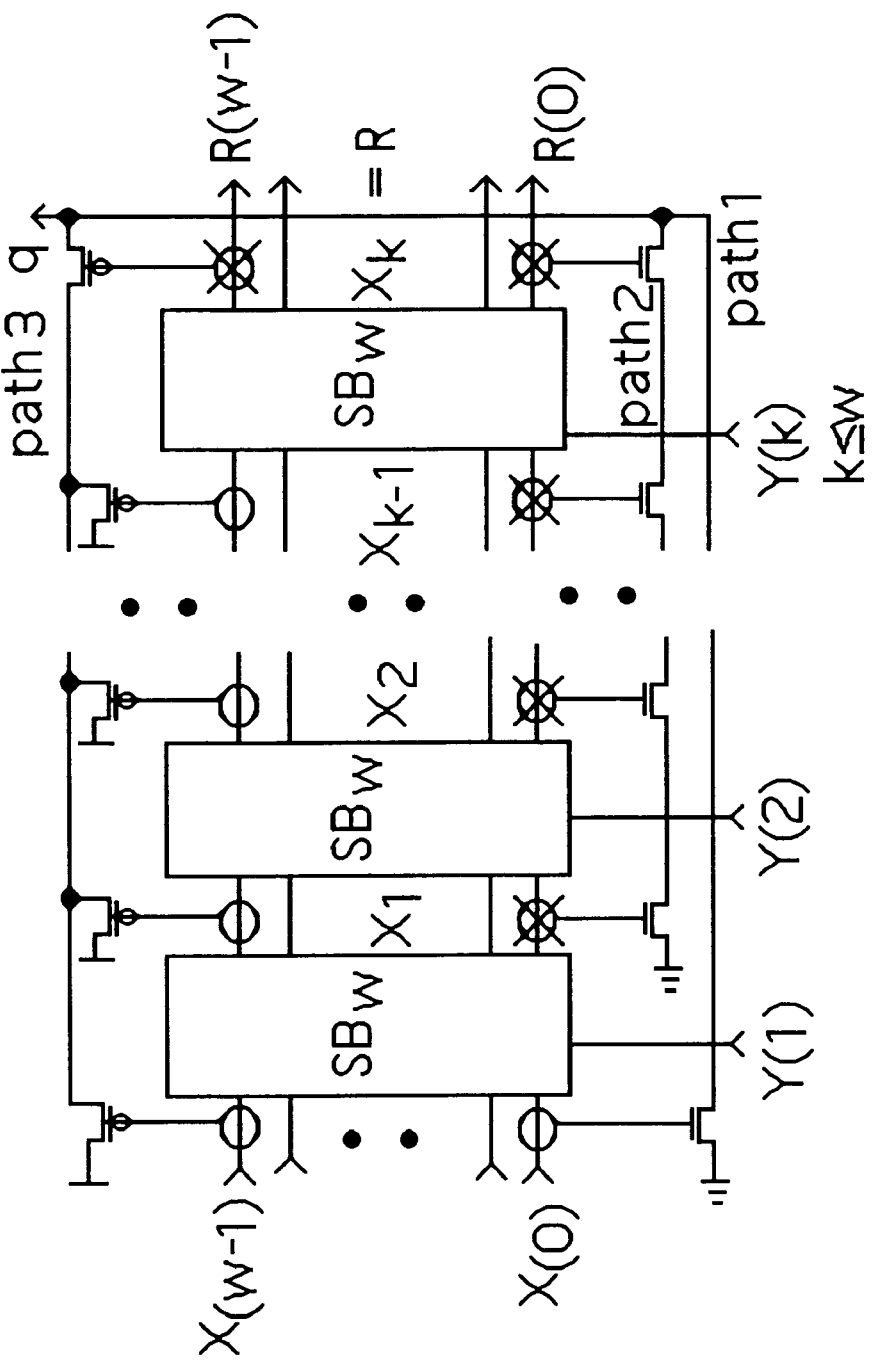
FIG. 9 is the block diagram of CMOS shift switch cell Ckc (k<w) constructed based on property 4.

Referring now to FIGS. 9 and 10, the proof can be briefly described as follows: If X0=0, then X0+$\Sigma Y$<w, so q=0. If all Xh≠0 ($1 \leq h \leq k$), which means that the unique bit has never been shifted to the bottom line, q=0. On the other hand, if q=0, from the shift switch logic Equation 1, X0+$\Sigma Y$=R<w, it implies that either X0=0 or X0≠0 and that all prefix sums of X0+$\Sigma Y$ are greater than 0 but never reach w; therefore, Xh≠0 ($1 \leq h \leq k$). If there exist an Xg=w−1 ($0 \leq g < k$) and Xk≠w−1, the control signals, g+1, ..., k, have wraparound shifted the unique bit from the top line of Xg to the bottom lines but not up to the w−1 position; consequently, q=1. Conversely, if q=1, from Equation 1, X0+$\Sigma Y$=qw+R$\geq$w. The control bits eventually will shift the unique bit to the top line of Xg (i.e., Xg=w−1) and push it down to the bottom. Consequently, the control bits will never be able to bring the unique bit up to the top again ($\Sigma Y \leq k<w$), thus Xk≠w−1.

Referring now to FIGS. 9 and 10a, illustrated is a shift switch cell called Ckc (k<w) and the way Property 4 is utilized for evaluating q. Each vertical line out of a circle marked with a cross represents a control bit produced from each bit of shifting signal within the circle, such that the controlled transistor is on if and only if the shifting bit is not a unique bit. FIG. 10 shows a CMOS implementations of cell C(w−1)c or C3c (w=4). It is straightforward to verify the correctness of the circuits.

Property 4 can be restated in another form, as seen in FIG. 10b:

(The modified Property 4)

$$q = 0 \quad \text{iff } X0 = 0 \text{ or all } Xh \neq 0 \quad (1 \leq h \leq k)$$
$$q = 1 \quad \text{iff } X0 \neq 0 \text{ and there exists and } Xg = 0 \quad (0 < g \leq k)$$

Condition
  all Xh≠0 ($1 \leq h \leq k$)
can be replaced by:
  all Xh≠0 ($1 \leq h \leq k$, h≠i for some i$\geq$1) and $X_{i-1} \neq w-1$ or Yi=0

Figure 10D:
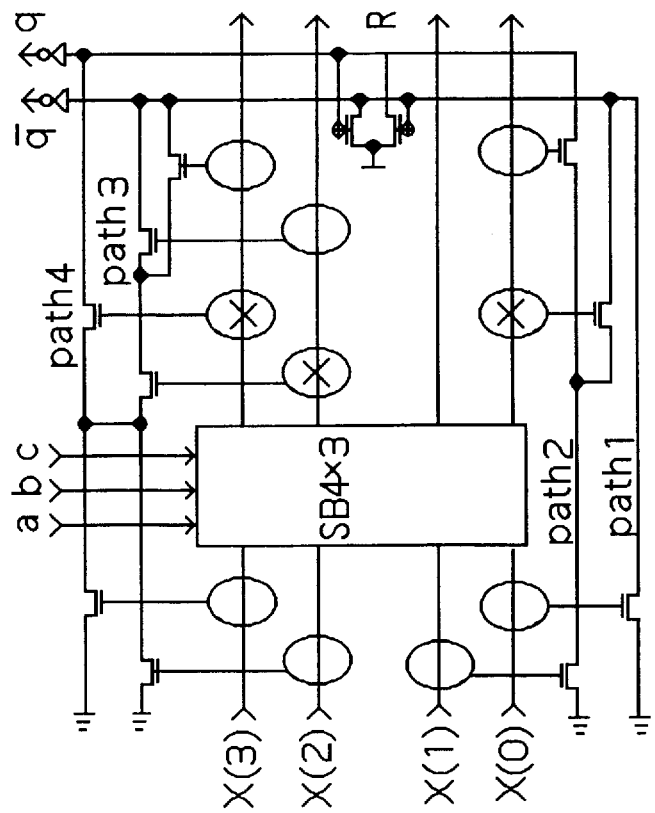
Figure 10C:
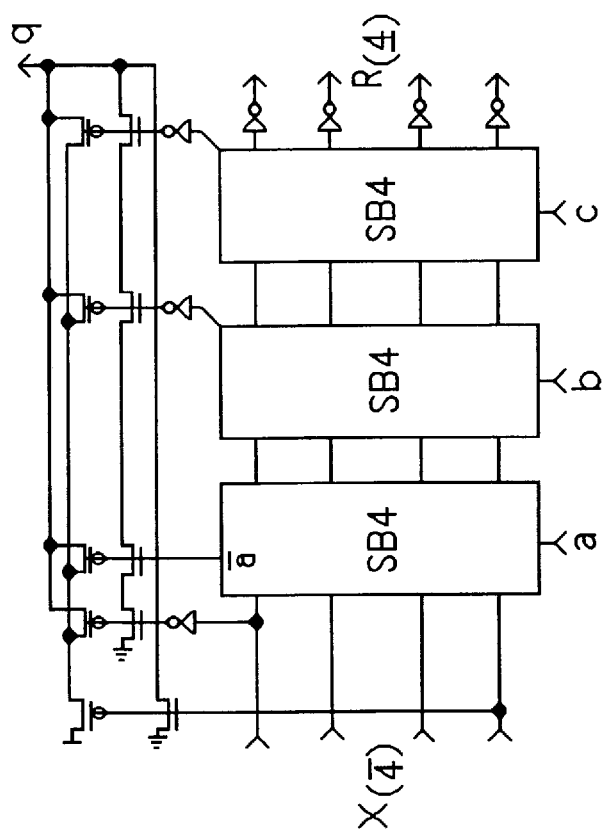

If such replacements occur for multiple times (i.e., for i,j, ...), it will always result in an alternative (equivalent) to Property 4 as illustrated in FIG. 10c.

For w=4, Property 4 can be modified to evaluate q by fully using state signal bits or processing state signal bits in vertical direction and is stated as follows:

For a shift switch cell of ($X_{(4)}$, (a,b,c), q, $R_{(4)}$), w=4 and $\Sigma Y=3$, the following holds: (the modified Property 4 with state signal bits fully used)

$$q = 0 \quad \text{iff } X = 0 \text{ or } (X = 1 \text{ and } R \neq 0) \text{ or } (X = 2 \text{ and } R = (2 \text{ or } 3)) \text{ or } (X = 3 \text{ and } R = 3)$$
$$q = 1 \quad \text{iff } (X = 1 \text{ and } R = 0) \text{ or } (X = 2 \text{ and } R \neq 2 \text{ and } R \neq 3) \text{ or } (X = 3 \text{ and } R \neq 3)$$

Figure 10E:
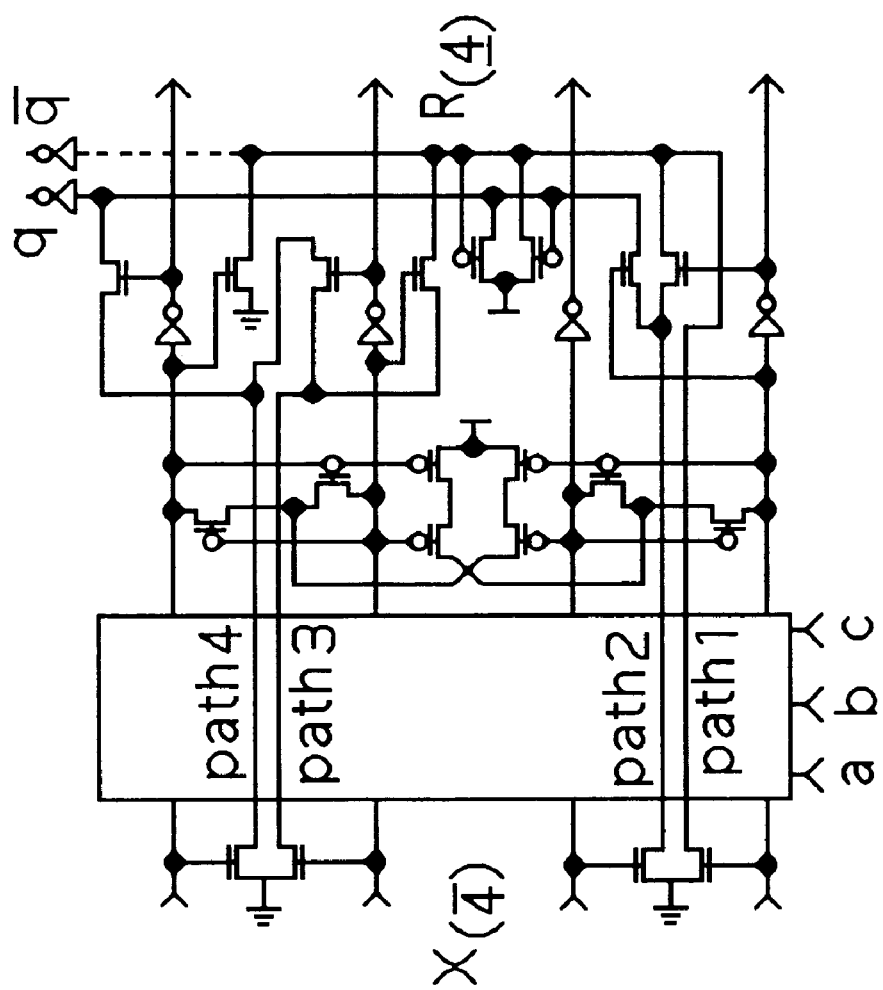

Referring now to FIGS. 10d and 10e, shown is the process. The modified CPL implementation is used for the circuit of FIG. 10e.

The definition of shift switch cell includes a properly larger set of shift switches, and it can be extended to involve shift switches where $\Sigma Y$ may reach w. A set of switch cells with a width of 4 is called the C4 family, and its direct applications (i.e., (7,3)) to parallel counters and compressors, each with an input of seven, traditional binary bits will then be considered.

A shift switch unit is a shift switch ($X_{(w)}$, Y, $R_{(w)}$, Q) where $\Sigma Y \leq w$.

Since X<w, from Equation 1 for a shift switch cell, $\Sigma Q \leq 1$. It can still be represented by q; however, the evaluation of q now becomes a bit more involved. The first approach which will be shown constructs a switch unit from two cells, assuming that Y can be decomposed into two sets and that the weighted sum of each of these sets is no more than w/2.

Figure 11A:
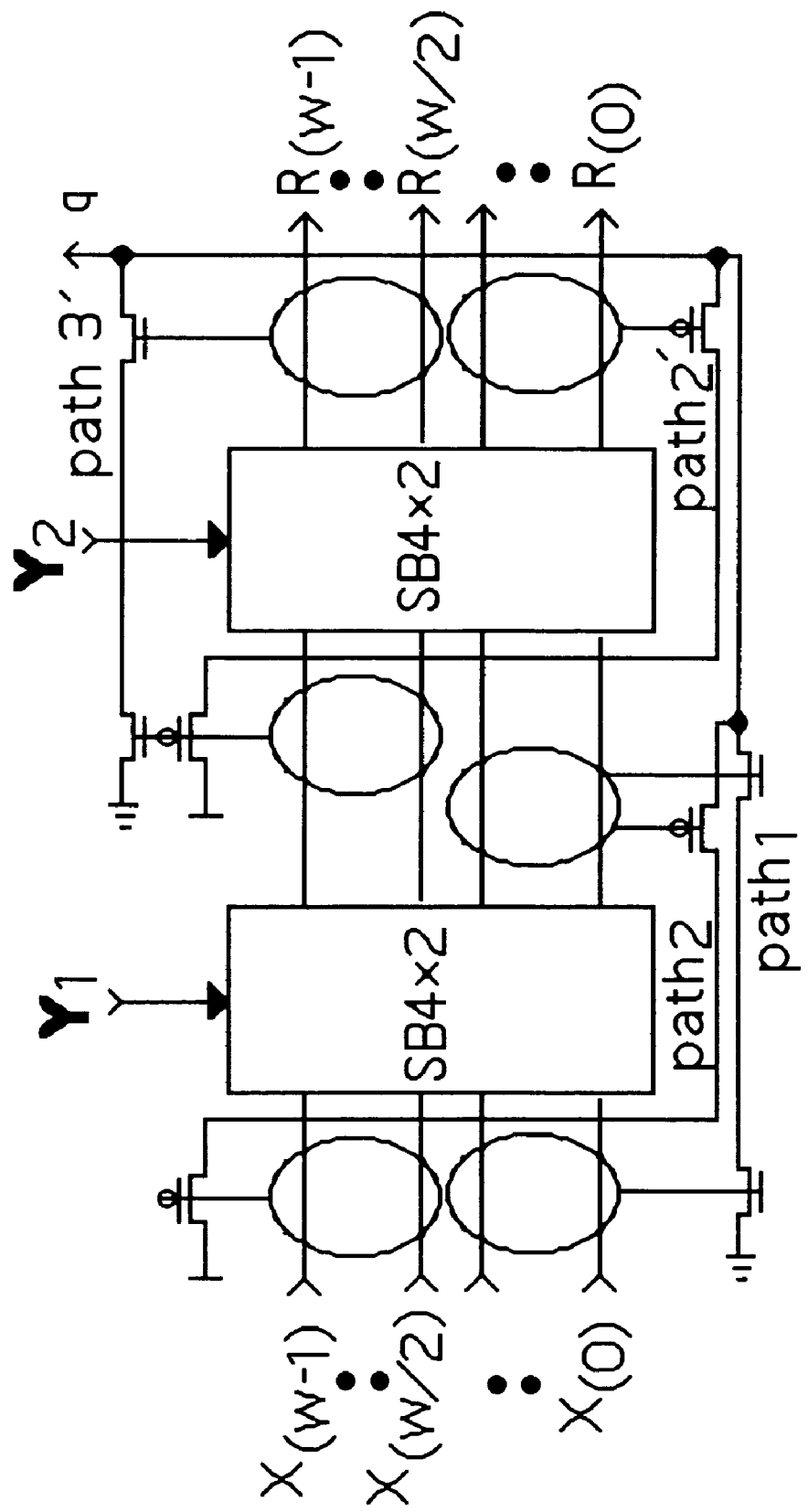
FIGS. 11a, 11b, 11c, and 11d show shift switch unit Cwa constructed by two of C(w/2)a and the CMOS pass-transistor-logic implementation of Cwa for w=4 using C2a of FIG. 6.

FIG. 11a illustrates a general schematic block diagram for the construction of a composite shift switch unit debited by Cwa=($X_{(w)}$, Y=(Y1,Y2), $R_{(w)}$, q) where $\Sigma Y1$, $\Sigma Y \leq W/2$. It also shows that Property 2 is applied twice for the evaluation of q. Clearly, the structure comprises two cascaded simple cells of $\Sigma Y=w/2$, except that path 3 (from source and/or drain to q), of the first cell and path 1 of the second cell are removed.

Path 1 of the first cell now has an additional connection to gates controlled by each of the first half remainder bits before connecting to its q. The quotient output of the first cell now is connected to the quotient output of the second cell, producing q of the unit, and path 3 of the second cell is now controlled by each of the second half shift-in bits of the second cell. It is easy to verify that for the resulting structure, the logic of Equation 1 holds. The correctness of R is obvious.

Now if the unique bit u of the shifting signal at a position between two cells is in the bottom circle, a correct q has been produced by the first cell. Otherwise, the first cell will produce nothing (due to an open circuit), the unique bit is in the top circle in the middle, and the second cell then produces a correct q. Therefore, for all cases of inputs, the switch unit evaluates its outputs correctly.

FIG. 11 also shows two efficient pass-transistor-logic implementation techniques for the circuits. One with signal swing restoration realized by a feed-back transistor, the other is called modified CPL, where pairwise cross-couple small pMOS transistors are used for signal swing restoration and a cross-couple transistor is used for missing signal restoration.

Figure 11B:
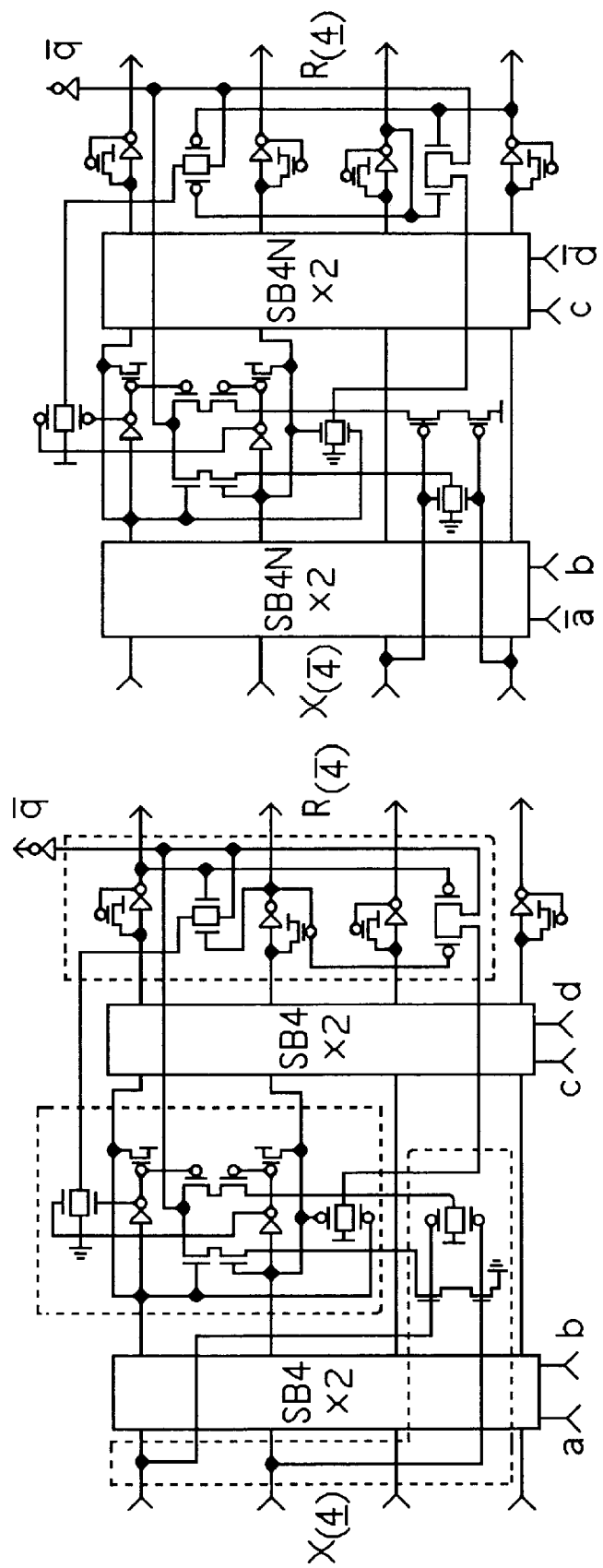
Figure 11C:
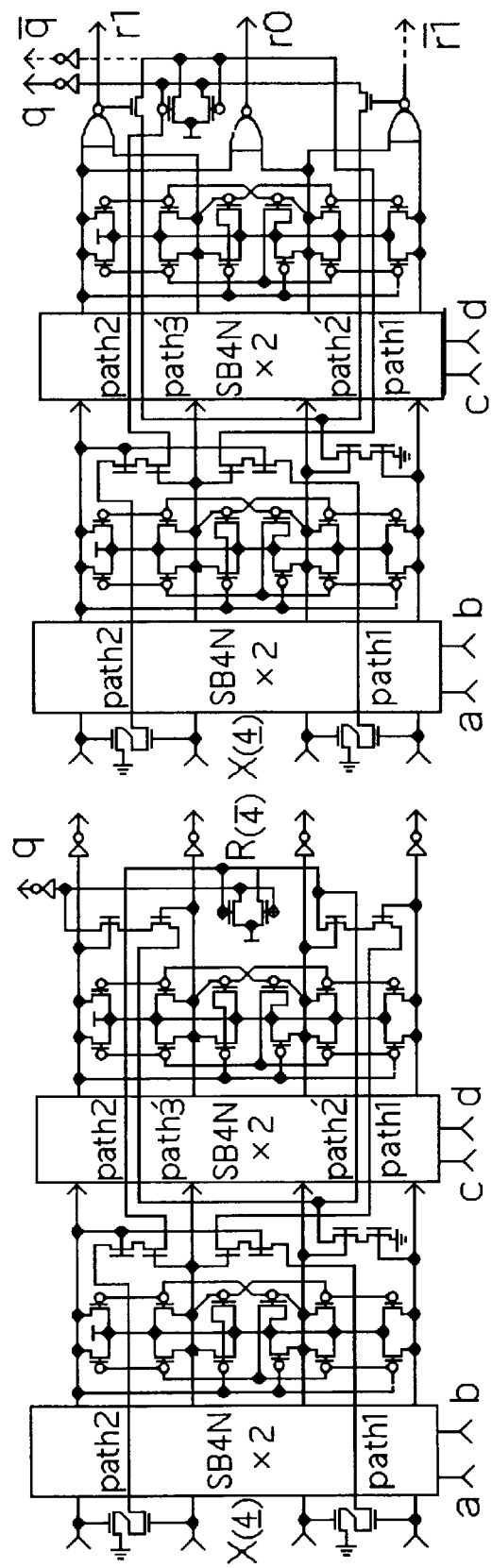
Figure 11D:
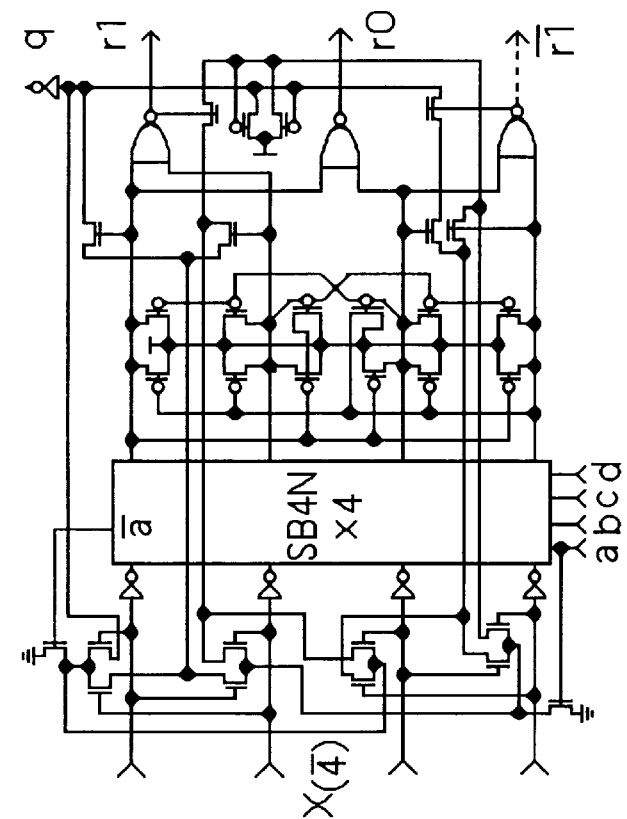
Figure 11D:
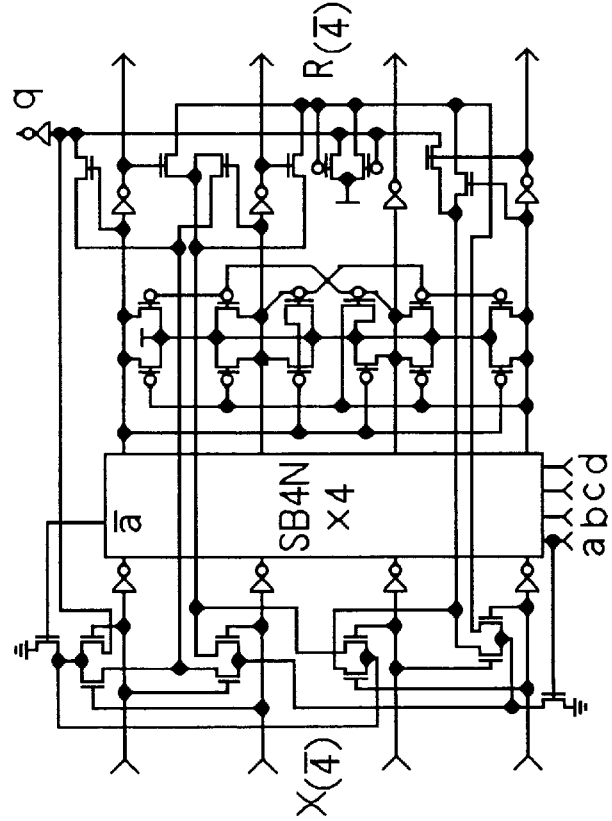

Referring to FIGS. 11b, 11c, and 11d, two CMOS implementations of switch unit C4a (i.e., Cwa, w=4, using C2a of FIG. 6b) are shown. The circuit of FIG. 11b has signal swing restoration realized by a fed-back small pMOS transistor.[22] The circuits of 11c and 11d utilize the inventive, modified CMOS pass-transistor-logic technique. The traditional CPL considers only double rail (or complementary binary) signals, which the modification allows signals being processed to be state signals (for w=4 in this documentation). In the new CPL logic, the state signal swing restoration is realized by pairwise cross-couple small pMOS transistors, and the q sub-circuit differential stage is achieved through missing signal restoration (exactly one of q or q) as illustrated in FIGS. 6c, 10d, and 10e. These two features are additions to the traditional CPL.

Referring now to FIG. 10d, the parallel counter shown is ready to produce five output bits q, r0 and r1 as well as the complements of q and r1. These two additional bits (r1 and q) may be used to speed up the set-up of the front shift bars of a C4 in the next stage if it is necessary.

Figure 12C:
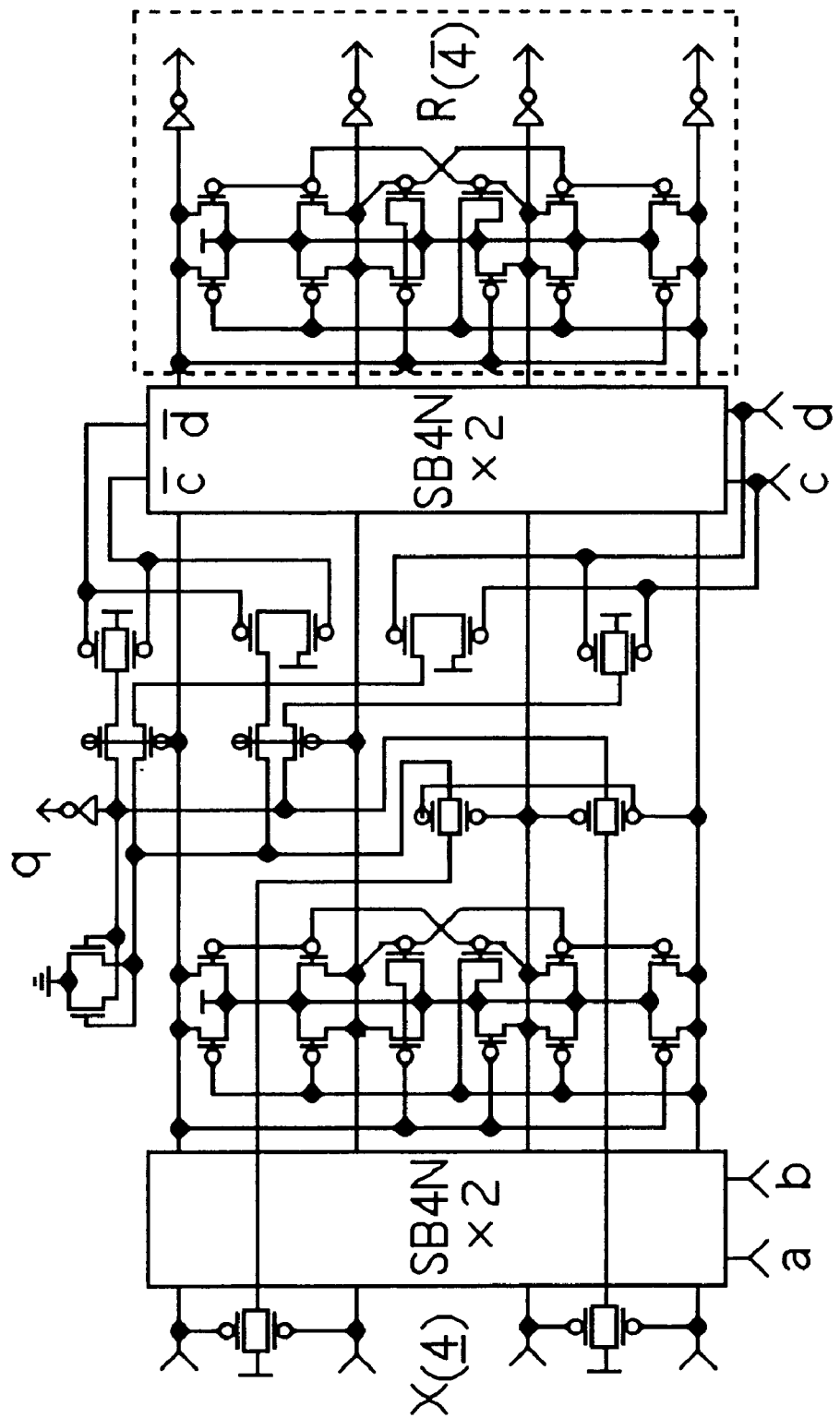

FIG. 12 shows the construction and the CMOS pass-transistor-logic circuit implementations of switch unit (parallel counter) C4b' using C2b of FIG. 8b with encoders added. The circuit of FIG. 12b has signal swing restoration realized by a fed-back pMOS transistor.

Figure 13A:
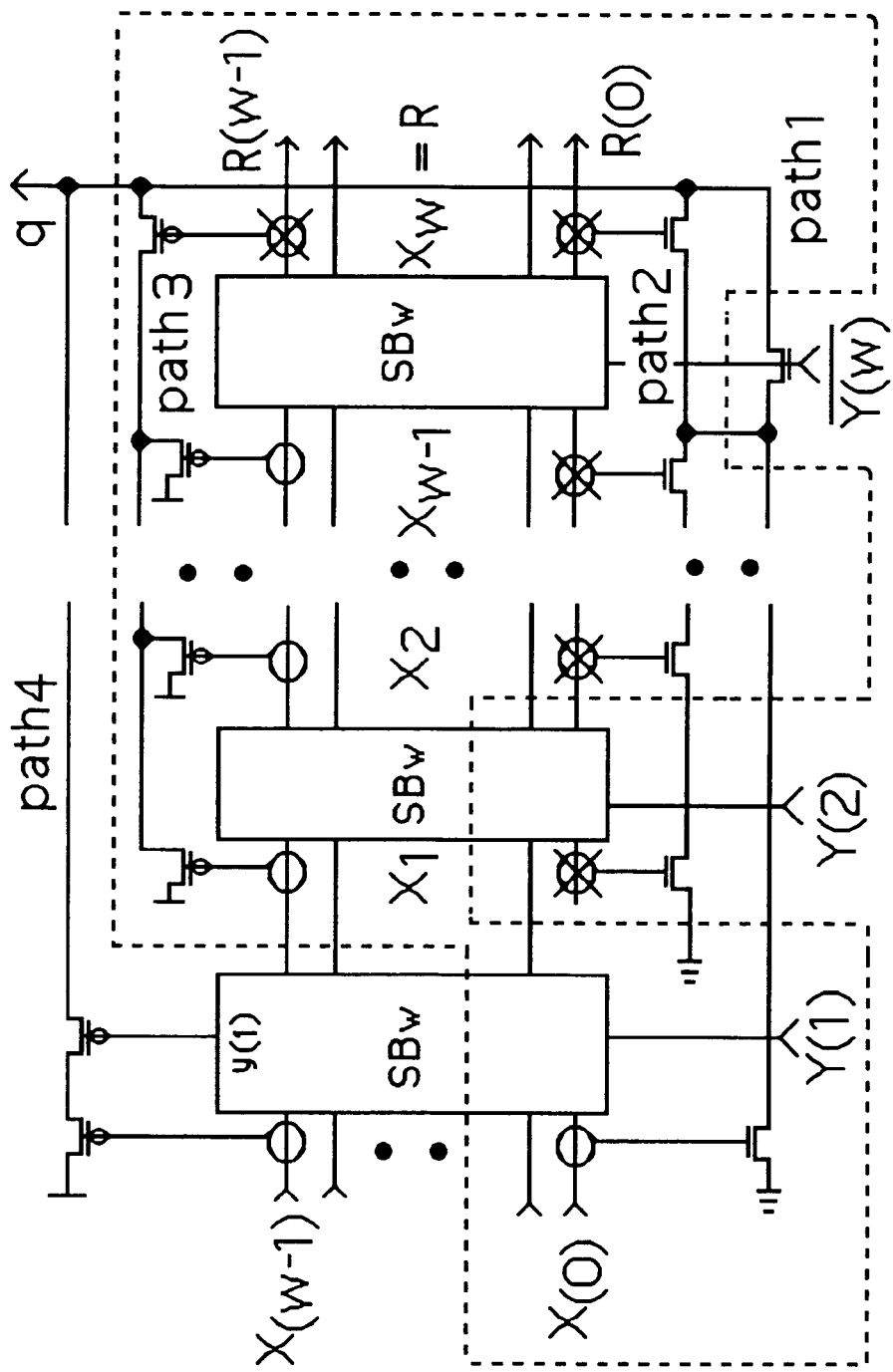
Figure 13E:
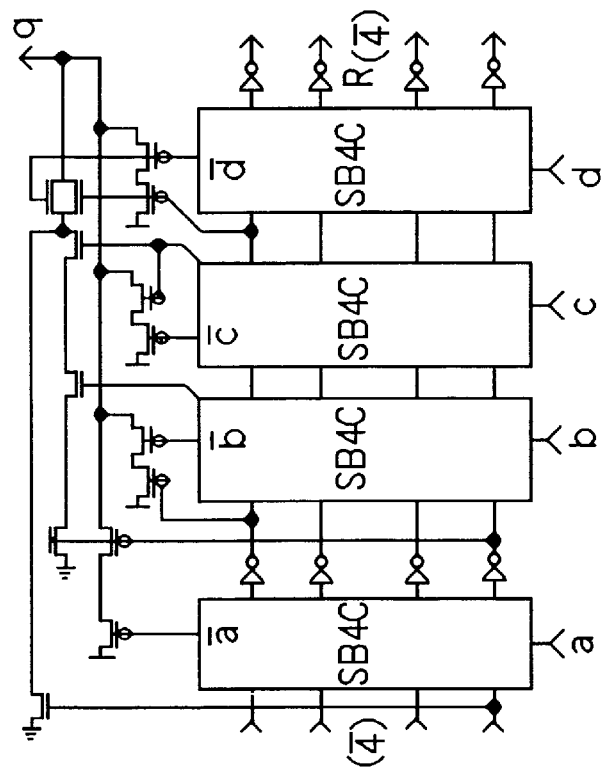
Figure 13D:
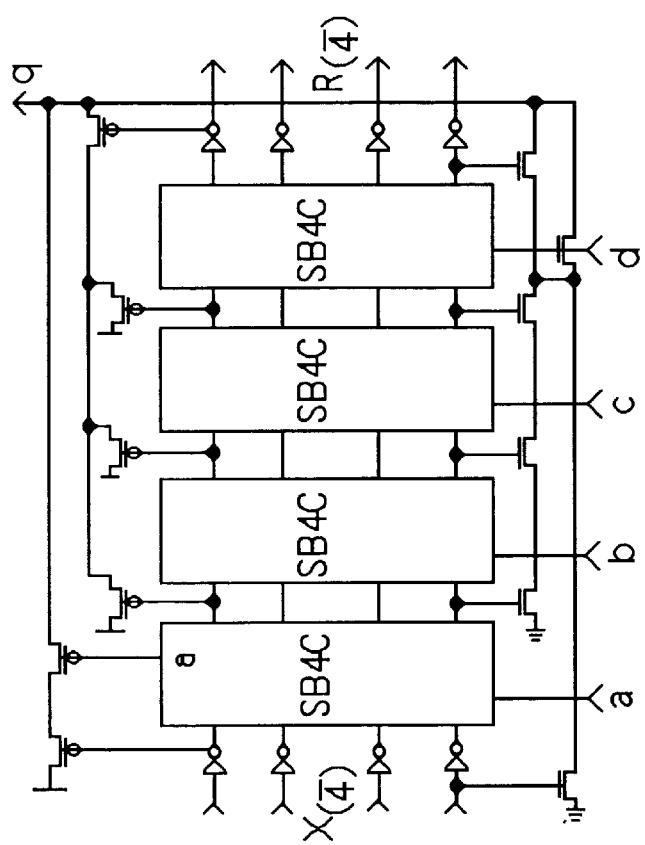

The shift switch units (parallel compressor), constructed based on Ckc (k<w) cells, are denoted by Cwc. FIG. 13a shows the CMOS construction block diagrams of a Cwc. FIG. 13b shows the pass-transistor-logic circuit implementation of C4c. The circuit of FIG. 13c is based on C3c of FIG. 10e. The state signal swing restoration for both circuits of FIG. 13b and FIG. 13c is realized by a fed-back pMOS transistor. Their q circuit is obtained through merging two sub-circuits, one for control bit a=0, the other for a=1. FIGS. 13d and 13e show the CMOS transmission gate based implementations of the switch unit. FIG. 13e is obtained from the modification of FIG. 13d. FIGS. 13f and 13g are similar to FIG. 13c except both FIGS. 13f and 13g use modified CPL techniques.

Figure 14:
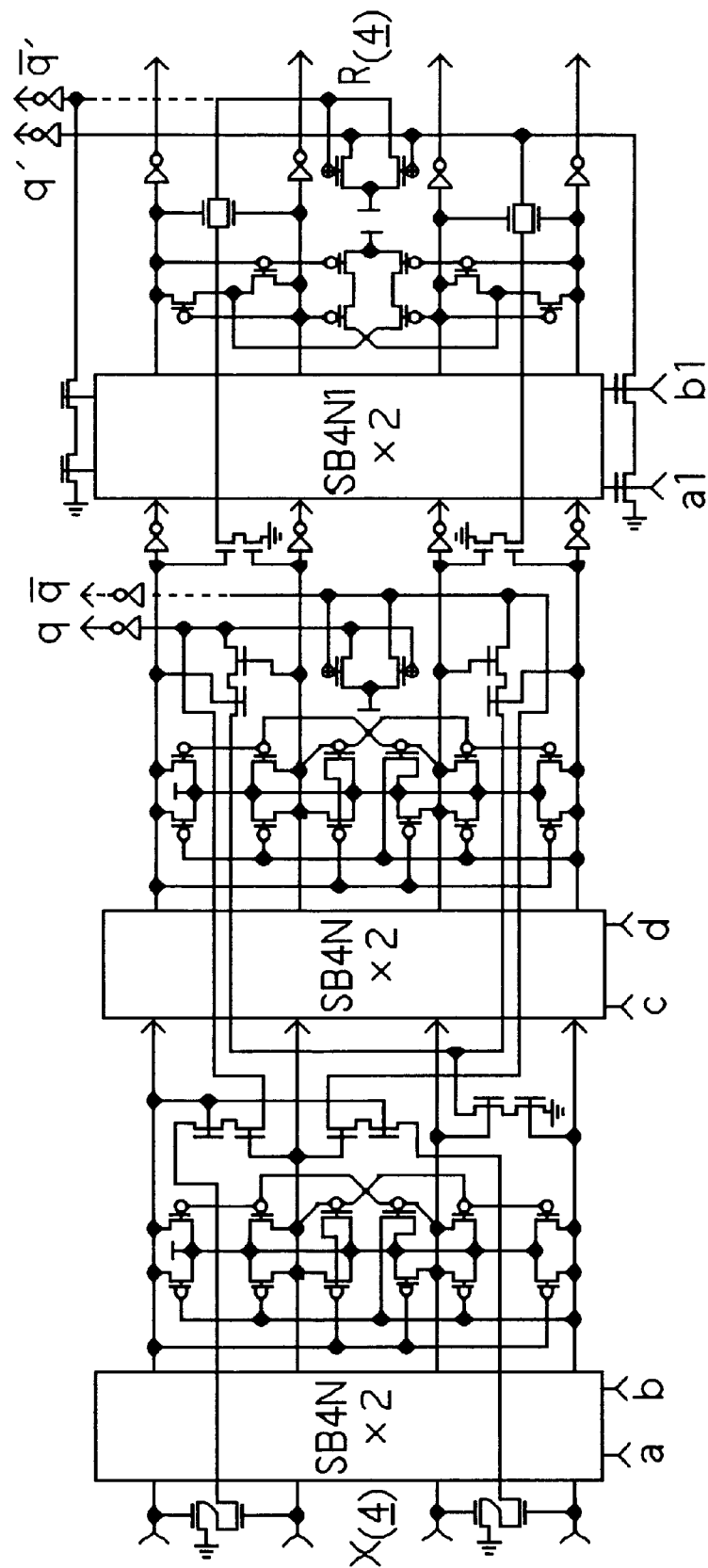
FIG. 14 is the C4-C2* compressor pair (equivalent to two cascaded C4s)

FIG. 14 shows a special parallel compressor called C4-C2* compressor pair which is functionally equivalent to two C4 configurations. Since the fifth and sixth control bits of the shift switch have weight k=1 (i.e., a1, b1, can be 0 or 2), the third shift-bar is SBN41×2. The shifting signal will pass no more than four cascaded nMOS pass-transistors (before inverted). When a state signal passes a shift-bar, its signal level is restored by pairwise cross-couple small pMOS transistors, and two quotient bits (q and q') are produced by the modified CPL.

Figure 15B:
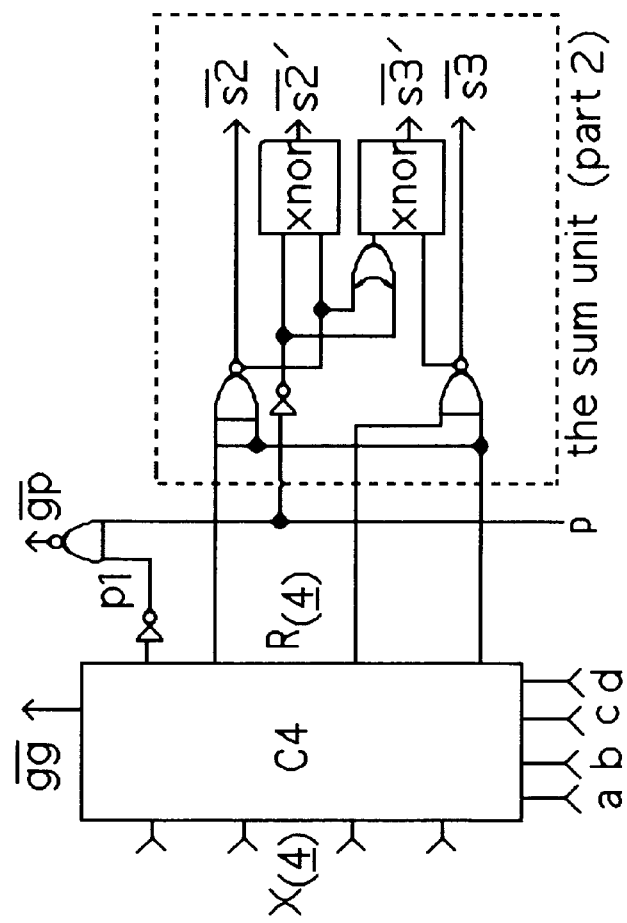
FIGS. 15a, 15b, and 15c show switch units C3* and C4* and the group carry generate-propagate unit.
Figure 15A:
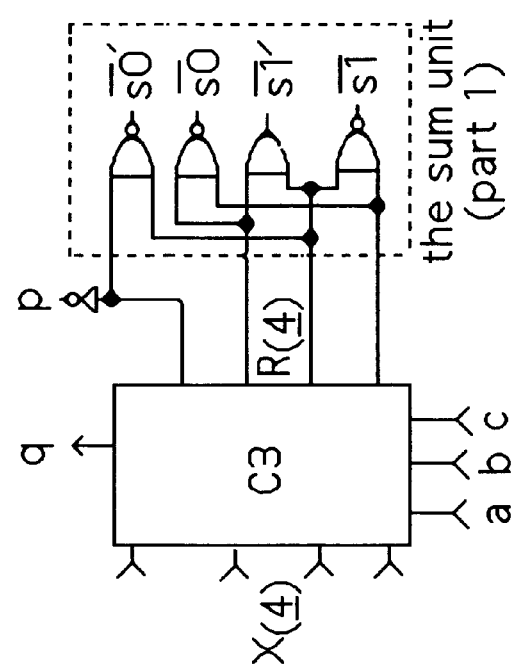
Figure 15C:
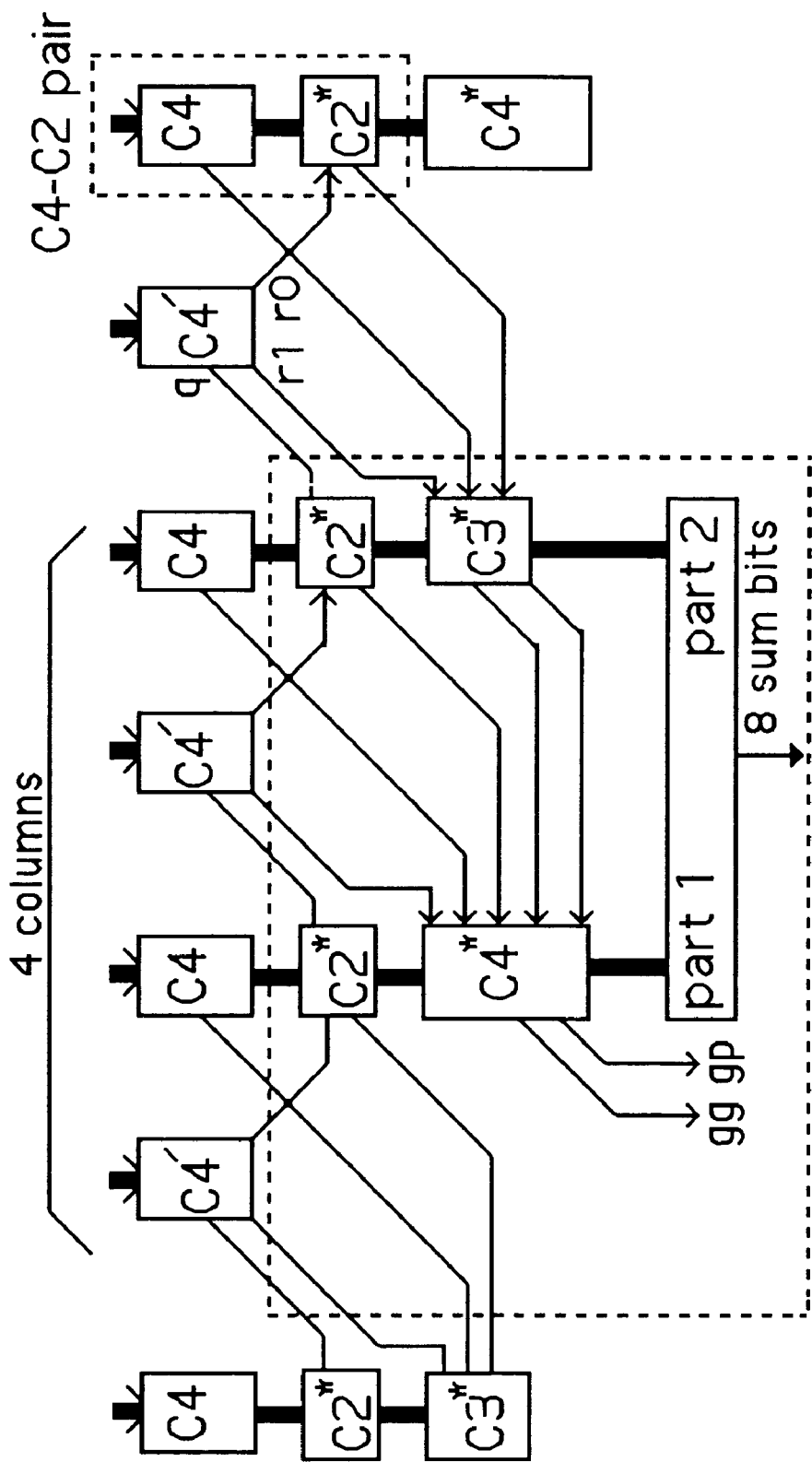

FIGS. 15a and 15b show two special parallel counters called C3* and C4* which are composed of parallel counters C3 and C4 and an additional device called a sum unit. FIG. 15c shows how C3* and C4* counters are connected together to produce two bits, called group (of 4 columns) carry generate and propagate bits, gg and gp, and two remainder state signals. C3* cell also produces bit p for C4*, C4* cell produces bit gp, meanwhile it also receives the quotient bit of C3* and produces gg, which is, in fact, its quotient bit. Two remainder state signals produced by C3 and C4 are sent to the group sum unit. It produces two sets, a total of 8 sum bits (s0 to s3 and s0' to s3'), corresponding to the group carry-in 0 and 1, respectively. The group sum unit is not on the critical path of the multiplier.

In operation, a shift switch receives a shift-in state signal as one of its inputs and produces a shift-out state signal as one of its outputs. By converting w-1 numbers of regular (binary) signals, the input state signal $X_{(w)}$ can be obtained, while the output state signal usually needs no change. This is one of major advantages of shift switching mechanism in parallel processing. The output state signal keeps propagating along a chain of cascaded shift switches until reaching its end. Then a state-to-binary converter (or encoder) is needed.

Figure 16:
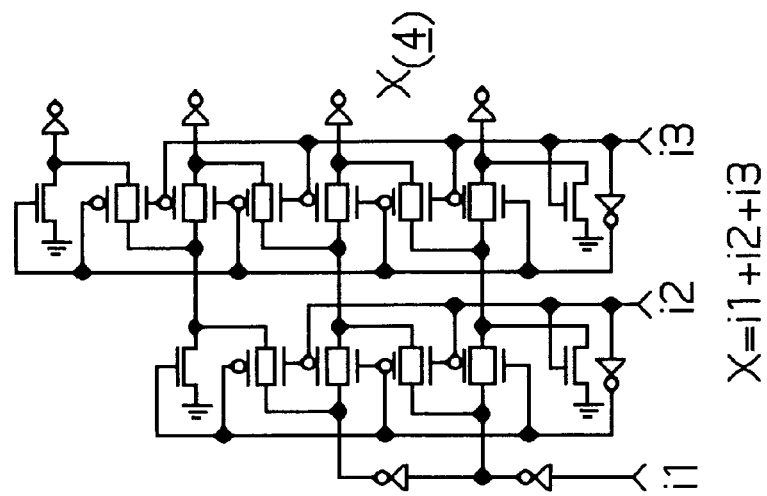
FIG. 16 is the CMOS converters which convert regular (binary) bits into state signals.
Figure 16:
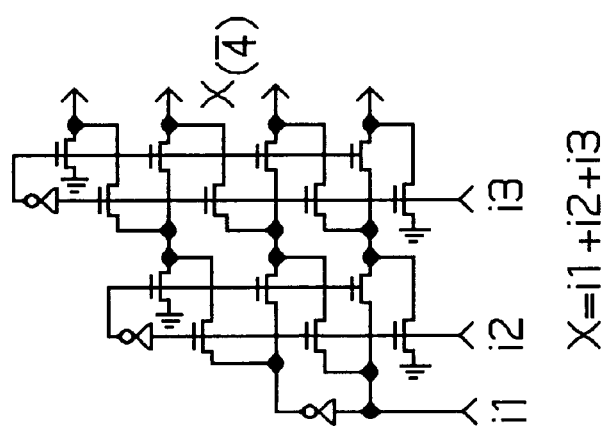
Figure 16:
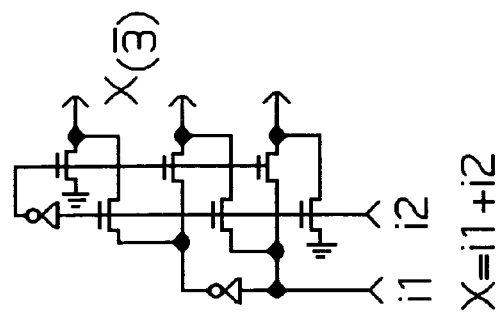
Figure 16:
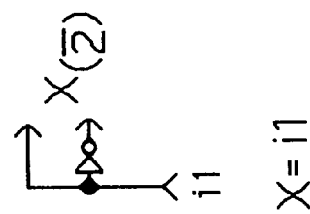

Referring to FIG. 16, illustrated is a CMOS regular-to-state (RS) converter which converts w-1 binary bits into a state signal $X_{(w)}$, such that the sum of the binary bits equals X. The converters for obtaining $X_{(w)}$ with w=2, 3 and 4 are shown. The illustrated process is suitable for larger values of w and can be modified simply to directly obtain $X_{(w)}$.

Referring again to FIG. 16, shown is the CMOS schematic of the RS converter which converts three binary bits into $X_{(4)}$.

State signal $R_{(w)}$ is a decoded form of the binary number R. In order to convert $R_{(w)}$ into a binary number, a w-to-[logw] encoder (two 2-input NAND gates) is used.

Referring back to FIG. 12b, if the remainder state signal of a C4 compressor is encoded, the resulting device is called a C4 counter.

With a regular-to-state (RS) converter, which converts w-1 binary bits into $X_{(w)}$, and a shift switch S<w, Y, Q>, a larger parallel compressor can be constructed by cascading them directly which compresses (reduces) w-1 binary bits plus signals (usually binary bits) of Y into a remainder $R_{(w)}$ plus signals (usually binary bits) of Q.

A set of such shift switch compressors with seven, six, and five input bits are called (7,3), (6,3), and (5,3), respectively. Each of these compressors is obtained by cascading an RS and a C4 (or C3 or C2) compressor. If the remainder state signal of such a compressor is encoded, the result will be a counter, denoted by (7,3)', (6,3)', or (5,3)'.

Referring now to FIG. 17, shown is a (7,3) parallel counter-compressor family. FIG. 17a shows a (7,3) counter composed of a RS and a C4a variant. FIG. 17b show a (7,3) compressor composed of the RS and the C4c variant of FIG. 13f. FIGS. 17c and 17d show a (6,3) and a (5,3) parallel compressor, respectively. The paths shown in FIGS. 17a and 17d have created initial signals for C4a' and C2a; they will directly propagate through the first shift-bars with no additional load (i.e., four transistors are removed from each of C4a' and C2a (FIGS. 11c and 6d)). There is only one logic stage, in differential form, for such a parallel counter. This feature shows speed superiority over all known counterparts.

If a C4 compressor is coupled with a C4 counter, the combined device reduces its total inputs exactly by half, as does a (4,2) counter.[15] In other words, it reduces two state signals, as shift-in, plus eight binary bits, as controls, into one state signal, as remainders, and two quotient bits plus two encoded binary bits.

Figure 18:
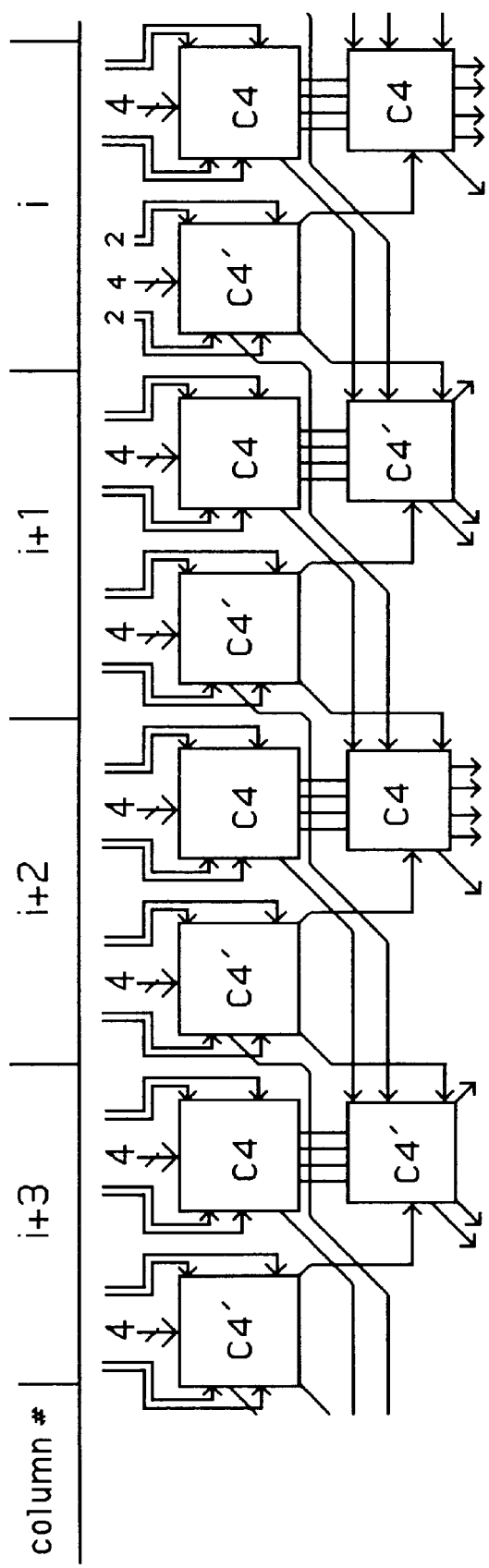
FIG. 18 illustrates a two-stage C4 (binary reduction) tree network.

Referring to FIG. 18, illustrated is a binary partial product reduction tree, termed a C4 tree. The reduction process is a binary tree reduction and usually begins with (7,3)s or (7,3) family members like (6,3) or (5,3) counter-compressor pairs as the first level (stage) tree nodes, followed by several levels of C4 counter-compressor pairs, and ends with a single C4 in each column. The results produced by the final level of C4s can be seen as a binary number (all composed of quotient bits) plus a number represented by a sequence of state signals (all composed of remainder bits) which can be processed by a group carrying a generate-propagate unit and a sum unit for the final addition or can simply be converted into a total of three numbers for final addition.

A C4 is functionally equivalent to a (6,3) parallel counter or three full adders. This is because a state signal of width 4 is equivalent to two binary bits (i.e., r1 and r0, a C4 counter can be used instead of compressor to have r1 and r0; there is negligible difference in delay), thus a C4 compressor or counter reduces six effective input bits into three. The initial conversion time, from binary to state signal, can be compensated by the savings in the final stage of the tree operation which converts four C4 outputs into groups of four columns carrying generate and propagate bits. Since a (6,3) parallel counter is functionally equivalent to one and a half (4,2) counters or three full adders, the novel C4s can be compared with existing corresponding circuits in certain details.

Scheme A Compressor: C4a of FIG. 13f
  Counter: C4a' of FIG. 13g
Scheme B Compressor: C4a of FIG. 11b (dual circuits)
  Counter: C4b' of FIG. 12b
Scheme C Compressor: C4c of FIG. 13b (and it dual)
  Counter: C4b' of FIG. 12b

The dual compressor circuits of schemes B and C are used in their C4 trees in a way that circuits are connected to their duals alternatively. The state signal going to the end of the tree of N-type should be made into one which is required by the counter as seen in FIG. 12b. This can be accomplished by adjusting the compressor types in the first stage according to the compressor's column numbers.

Referring to Table 1, novel circuits of this work are compared with the best known of prior art.[3,21,22]

| application | C4 tree (inventive logic) scheme A | scheme B | scheme C | (4,2) tree of [3] | (4,2) tree of [23] | Wallace (3,2) tree of [22] |
|---|---|---|---|---|---|---|
| Transistor count | 22.5 + 5* | 23.5 + 2* | 23.5 + 2* | 24 | 29 + 3* | 28 + 4* |
| speed | fast | mid | mid | slow | slow | fast |
| regularity | high | high | high | mid | mid | low |
| Power dissipation | low | mid | low | low | low | high |
| # of nodes and wiring overhead | low | low | low | high | mid | high |

The numbers and rank of the device are with respect to a full adder equivalent (FE) of the device. Since the numbers of the devices required for reducing a given partial product matrix using approaches based on (3,2), (4,2) and C4, which are in a constant ratio of 6:3:2, the FE of a (4,2) on a transistor count is its transistor count divided by 2, while for a C4 it is divided by 3. The FE of a (4,2) or a C4 on delay is their delays divided by 1.5, this is due to the fact that they use about 1.5 times less stages than full adder network. This does not take into account the C4 approach which had one less stage than (4,2) approach. The merits shown reflect the whole application merits (partial product reduction network).

On average, a C4 circuit in a C4 tree with CPL technology comprises 57 to 61 nMOS transistors, each one being smaller than a pMOS transistor, 9 to 13 pMOS transistors, and 14 small pMOS pull-up transistors used for signal swing restoration; and a C4 circuit with LEAP technology comprising 51 nMOS transistors, 19 pMOS transistors and 6 small pull-up transistors for signal swing restoration. Both circuits have all transistors regularly organized, nearly in a matrix form.

Figure 19:
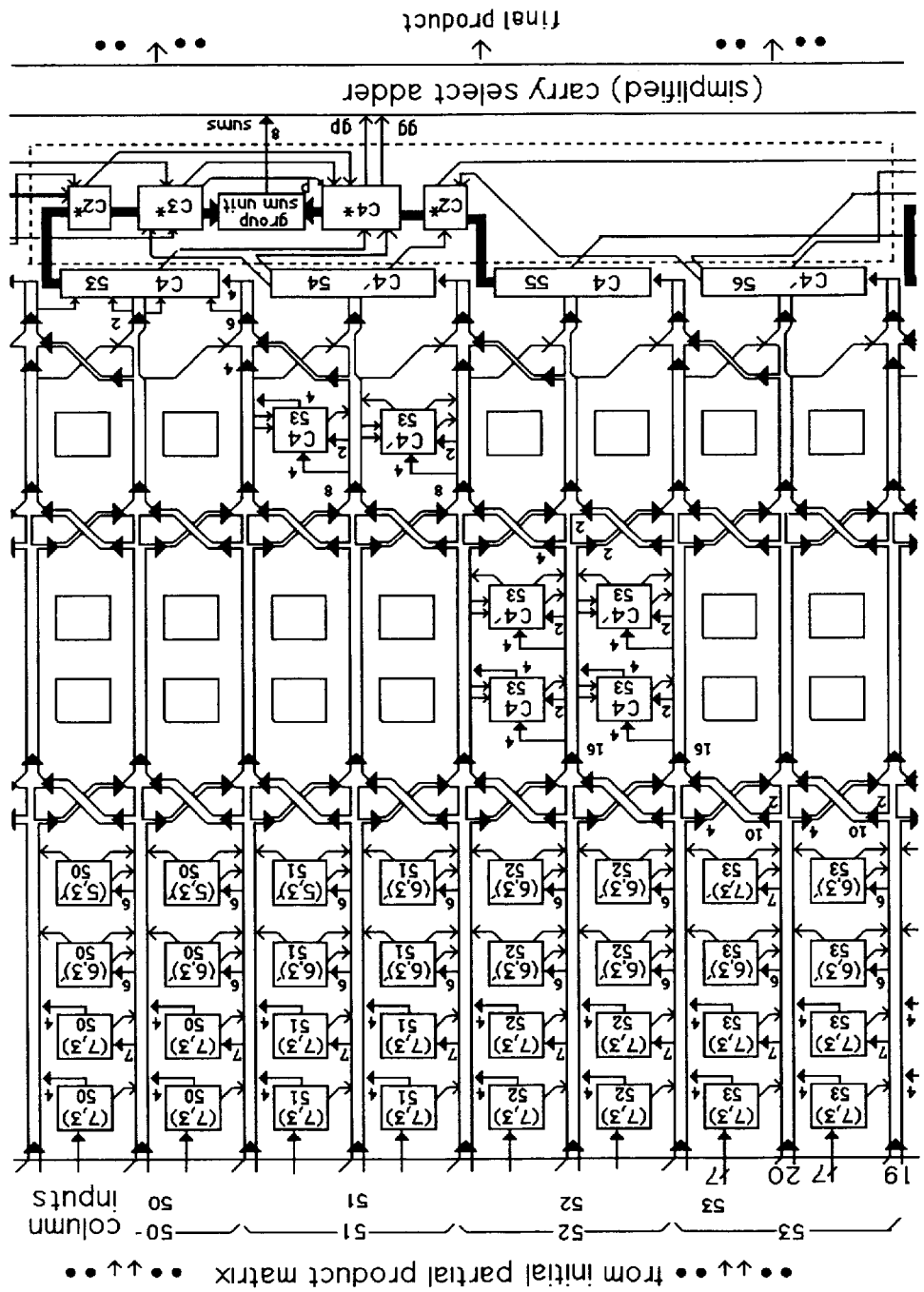
FIG. 19 illustrates the 64×64 floating number multiplier scheme based on C4 binary trees.

A tree-structured full array 64×64 (IEEE standard double precision) floating point multiplier scheme without using Booth recoding can now be introduced. FIG. 19 illustrates the architecture. The critical path area with column 53 is shown; most of the repeated components are not detailed. It includes the following four modules:

(1) A traditional direct partial product generator. It generates all partial products for two 53×53 (bit) numbers (the mantissas of the double-precision numbers including the sign bits), in a single row (105 columns).

(2) A partial product reduction network. Its major part is constructed as follows. At the first stage, for each column, a set of shift switch counters and compressors from the (7,3) family receives the input bits and reduces them in parallel. The outputs (state signals and binary bits) are all routed to the next stage. With these initial state signals (of width 4) and control binary bits, they are now processed (reduced) by a binary-tree shape reduction network. The network is composed solely of C4 family compressors. It is obtained through repeatedly applying two primitive operations of the logic to these switch cells and the resulting shift switches. During the process, exactly half the number of state signals produced in each stage are encoded to be binary control signals, while the other half propagate along the cascaded switch cells. Thus, the reduction possesses a binary tree structure in a unique form. Compared with the well known (4,2) counter-based reduction tree[15], the network requires no in-stage line crossing. Each (4,2) counter requires an in-stage line connection. The partial product reduction network shown in FIG. 19 includes a total of only four stages (i.e., 1, 2, 3 and 4), and it eventually reduces all partial products into a quotient bit and a state signal of width 4 in each column.

(3) A group carry generate-and-propagate bits generator. It receives the outputs from the partial product reduction network, processes them in groups with each group corresponding to four columns. The dotted box in FIG. 19 shows the group consisting of columns 53, 54, 55 and 56. The state signals coming to the first and the third columns of each group are applied directly to the shift switch C2* in the same column. The state signals from the second and the fourth columns are encoded into binary bits, which together with other quotient bits available from lower columns, are used to control the two switches of C2* implemented by C4-C2* pairs, as well as C3*, C4* which are cascaded to the C2*s. The C3* and C4* (see FIGS. 15a and 15b) produce the group gg and gp for the carry select adder, as well as the state signals for the group sum unit of each group. The group sum unit (see FIG. 15c) is not on the critical path of the multiplier. The sum unit produces two sets of eight sum bits corresponding to the group carry-in 0 and 1, respectively.

(4) The final carry select adder. This is a simplified traditional carry select adder. Since the input of the adder is a set of group carry propagate and generate bits (gg and gp) instead of two numbers, the initial stage of a traditional carry select adder, which produces a pair of gg and gp bits for every group of four columns using the two input numbers, is no longer needed.

Figure 20:
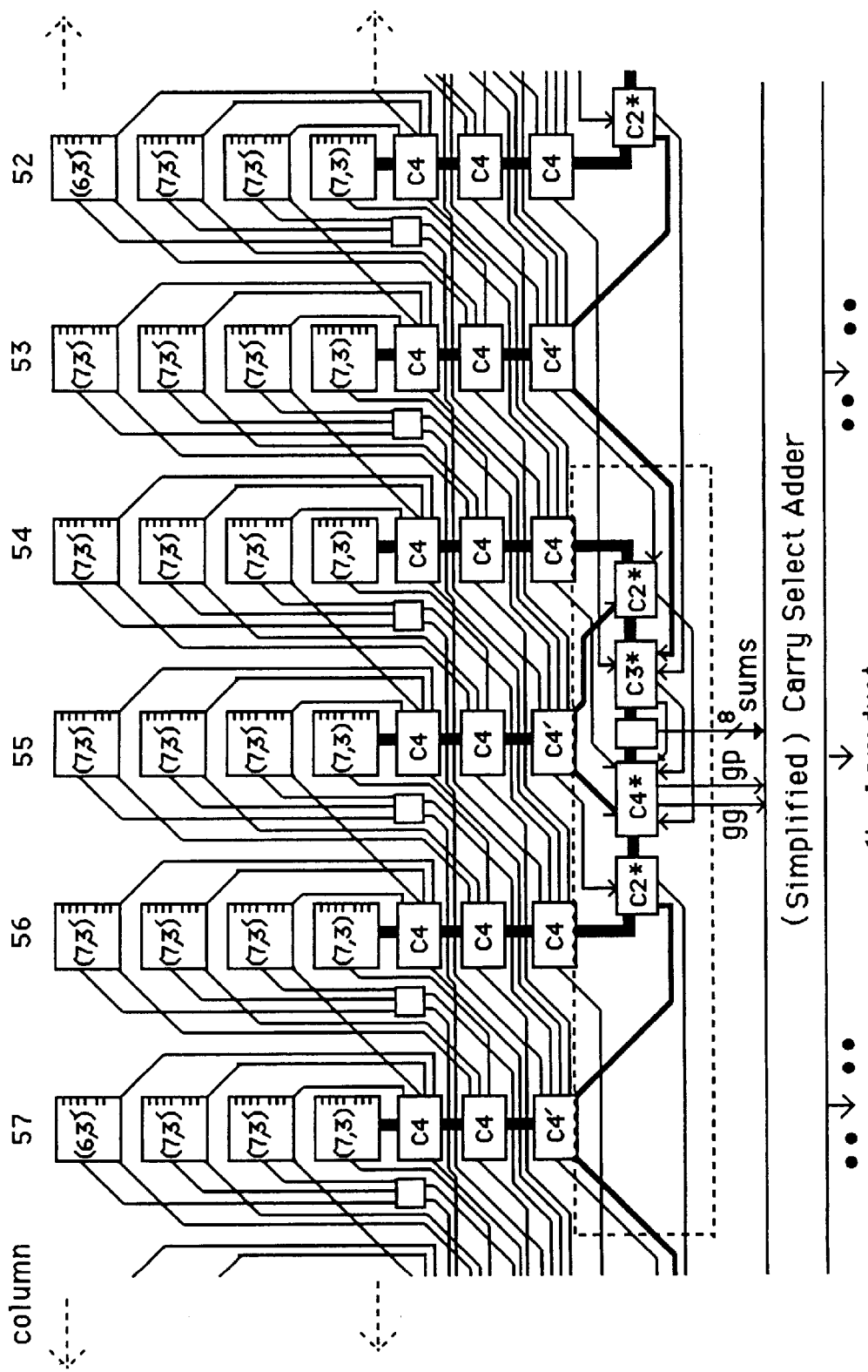
FIG. 20 illustrates the 64×64 floating number (linear form) multiplier scheme with Booth recoding.

Referring now to FIG. 20, there is shown a linear array-structured full array, 64×64 (IEEE standard double precision), floating point multiplier scheme with Booth recoding. The traditional Booth recoding and embedded partial product generation network, which involve the area cross over the network between the dotted arrows, is not shown. The input bits (i.e., a partial products) to the devices are indicated by small bars shown in the receiving device boxes.

The multiplier scheme also consists of four modules:
(1) the traditional Booth recoding and partial product generation network which now are embedded within the partial product reduction network;
(2) the partial product reduction network which reduces a bit matrix of height 28 (due to Booth recoding) into a quotient bit and a state signal of width 4 in each column. At the first stage, for each column, a set of counters and one compressor from the (7,3) family (including two (4,2) counters) receive the input bits and reduce them in parallel. There is only one compressor: the one following all of the counters in the column. This occurs in the area where partial product generator and recoding devices are embedded. The outputs of all binary bits are routed to the next stage as controls of the C4s, while each state signal propagates down to its contiguous C4. With these initial state signals (of width 4) and control binary bits, processing (reduction) then occurs by a linear array (in each column) shape reduction network. The network is also constructed solely by C4 family compressors, except a full adder is used to buffer and reduce remote control bits. It involves applying the cascade primitive operation repeatedly and cross primitive operation once for each column on these switch cells and the resulting shift switches. The partial product reduction network shown in FIG. 19 includes only four stages (i.e., 1, 2, 3 and 4) which finally reduces all partial products into a quotient bit and a state signal of width 4 in each column. The modules 3 and 4 are exactly the same as the non-Booth scheme shown in the last section.

The embedding of Booth recoding and partial product generation network into the partial product network is feasible in this scheme, because the number of bits in the matrix is reduced by half due to Booth recoding. It is possible to organize the first stage reducers (i.e., partial product direct receivers) efficiently, all in the top of each column. This significantly reduces the total area to be spanned by the partial product generator. The advantage of this scheme is that it has the most simple partial product reduction network structure (linear form in each column), a very compact critical path (as a chain of tightly connected switch cells), and requires an overall smaller VLSI area than other schemes.

REFERENCES

1. L. Dadda, On parallel digital multipliers, Alta Freq. 45, 1976, 574–580.
2. K. Hwang, Computer Arithmetic: Principles, Architectures and Designs, New York: Wiley, 1979.
3. G. Goto, A. Inoue, R. Ohe, S. Kashwakura, S. Mitarai, T. Tsuru, and T. Izawa, A 4.1-ns compact 54×54-b multiplier utilizing sign-select Booth encoders, IEEE Jourrnal of Solid-State Circuits, Vol. 32; No 11, November 1997.
4. J. Jang, H. Park and V. K. Proscenia, An optimal multiplication algorithm on reconfigurable mesh, Proc. of IEEE Symp. on Parallel & Distributed Processing 1992.
5. K. Bondalapati, and V. K. Proscenia, Reconfigurable Meshes: Theory and Practice, Proc. of Reconfigllrnhle Architecture Workshop: International Parallel Processing Symposium, April 1997.
6. R. Lin, Shift switching and novel arithmetic schemes, in Proc. of The 29th Asilomar Conference on Signals, Systems, & Computers, Pacific Grove, Calif., November 1995.
7. R. Lin, Fast Multiplier Schemes Using Large Parallel Counters and Shift Switches, to appear in Proc. of 4th Intl.Conf. on High Performance Computing, December 1997, Bangalore, India.
8. R. Lin, Shift switching with domino logic for asynchronous VLST comparator schemes, in Proc. of The 10th International Conference on VLSI Design, January. 1997, Hyderabad, India.
9. R. Lin, and S. Olariu, Reconfigurable buses with shift switching— concept and applications, in IEEE Trans. on Parallel And Distributed System.Vol. 6, No 1, January 1995, 93–102.
10. LSI logic 1.0 micron cell-based products data book, LSI logic corporation, Milpitas, Calif., 1991.
11. H. Makino, H. Suzuki, H. Morinaka, Y. Nakase and K. Mashiko, A 286 MHz 64-bit floating point multiplier with enhanced CG operation, Proc. of Symp. on VLSI Circuits, Kyoto, Japan. 1995.
12. V. Oklobdzija, D. Villager, S. S. Liu, A Method for speed optimized partial product reduction and generation of fast parallel multipliers using an algorithmic approach, IEEE Trans. on Computers, Vol. 45, no. 3, March. 1996, 294–306.
13. R. M. Owens, R. S. Bajwa, M. J. Irwin, Reducing the number of counters needed for integer multiplication, Proc.of The 12th IEEE Symp. on Computer Arithmetic, Bath England, July 1995.
14. J. H. Pasternak and C. A. T. Salama, "Differential pass-transistor logic" IEEE JCircuits and Devices, pp 23–28 July 1993.
15. M. R. Santoro and M. A. Horowitz, SPIM: A Pipelined 64×64-bit Iterative Multiplier, IEEE Journal of Solid-State Circuits, Vol. 24, no. 2, April 1989.
16. E. E. Swartzlander, Jr., Computer Arithmetic Vol. 1 and Vol. 2 (IEEE CSP, CA, 1990).
17. C. S. Wallace, A suggestion for a fast multiplier, IEEE Trans. Electronic Completers, Vol. Ec-13, 1964.
18. N. H. E. Weste and K. Eshraghian, Principles of CMOS VLSI Design, A Systems Perspective (Addison-Wesley Publishing Company, second Edition), 1993.
19. Z. Wang, G. A. Jullien, W.S. Miller, A new design technique for column compression multipliers, IEEE Trans. on Computers, Vol. 44, no. 8, August. 1995, 962–970.
20. X. Wu, Theory of transmission switches and its application to design of CMOS digital circuits", Int. J. Circuit theory application, Vol . 20, 1992.
21. K. Yano, T. Yamanaka, T. Nishida, M. Saito, K. Shimohigashi, and A. Shimizu, A 3.8-ns CMOS 16×16 multiplier using complementary pass-transistor logic, IEEE Journal of Solid-State Circuits, Vol. 25; No 2, April 1990.

22. K. Yano, Y. Suzuki, K. Rikino and K. Seki, Top-down pass-transistor logic design, IEEE Jourrnal of Solid-State Circuits Vol. 31; No 6, June 1996.

Since other modifications and changes varied to fit particular operating requirements and environments will apparent to those skilled in the art, the invention is not considered limited to the example chosen for purpose of disclosure, and covers all changes and modifications which do not constitute departures from the true spirit and scope of this invention.

What is claimed is:

1. A parallel multiplying device for use in a computing system, comprising:
   a) means for reducing six effective binary input bits into three effective bits, said reducing means comprises a plurality of transistors in a substantially symmetrical matrix for performing first, single logic staging;
   b) means for connecting said reducing means to a subsequent reducing means;
   c) means, operatively connected to said reducing means, for shifting the results of said first, single logic staging performing a subsequent, single logic staging;
   d) means for reducing the results of said subsequent, single logic staging to a number representative of the sum of said binary input bits.

2. The parallel multiplying device for use in a computing system in accordance with claim 1, wherein said plurality of transistors in a substantially symmetrical matrix comprises between 75 and 88 CMOS transistors and wherein said between 75 and 88 CMOS transistors comprises substantially 65% nMOS transistors.

3. The parallel multiplying device for use in a computing system in accordance with claim 1, wherein said shifting means comprises at least two independent, selectable, and controllable paths for state signals.

4. The parallel multiplying device of claim 1, wherein said means for reducing bits comprises at least one counter and at least one compressor.

5. The parallel multiplying device for use in a computing system in accordance with claim 1, wherein said results of said first, single logic staging comprises a first predetermined number of binary input bits and said results of said subsequent, single logic staging comprises a second number of binary input bits, less than said first predetermined number.

6. The parallel multiplying device for use in a computing system in accordance with claim 4, wherein said binary input bits represent a portion of a partial product array.

7. The parallel multiplying device for use in a computing system in accordance with claim 1, wherein said shifting means is adapted to produce at least a two-bit state signal, as a sum and a quotient bit as carry-out.

8. The parallel multiplying device for use in a computing system in accordance with claim 7, wherein said at least a two-bit state signal comprises a four-bit state signal.

9. The parallel multiplying device for use in a computing system in accordance with claim 7, wherein said at least a two-bit state signal comprises a encoded binary number.

10. The parallel multiplying device for use in a computing system in accordance with claim 1, wherein said shifting means comprises an array of four-bit, compressors and counters.

11. The parallel multiplying device for use in a computing system in accordance with claim 1, wherein said shifting means comprises a plurality of full-adders for locally and recursively processing said results of said single logic stagings and for controlling said reducing means.

12. The parallel multiplying device for use in a computing system in accordance with claim 11, wherein said plurality of full-adders comprises at least one from the group counters and compressors, and said locally and recursively processing comprises binary reduction.

13. A parallel multiplier for use in a computing system, comprising:
   a) means for reducing a plurality of input bits and performing first, single logic staging;
   b) means for shifting, operatively connected to said reducing means, said means for shifting having a plurality of externally-selectable operating modes for producing a subsequent, single logic staging responsive to (i) said first, single logic staging and (ii) a first quotient; and
   c) means for reducing operatively connected to said shifting means for producing an output representative of a sum of said plurality of input bits.

14. The parallel multiplier as recited in claim 13, wherein said means for shifting comprises a shift switch.

15. The parallel multiplies as recited in claim 14, wherein said externally selectable operating modes of said shift switch are selected by a control signal applied thereto.

16. The parallel multiplier as recited in claim 15, wherein said control signal comprises said first quotient.

17. The parallel multiplier as recited in claim 15, wherein said control signal comprises said encoded bit.

18. The parallel multiplier as recited in claim 16, wherein said first, single logic staging and said subsequent, single logic staging each comprises a data bus, said data buses each having a bus width of at least two bits.

19. The parallel multiplier as recited in claim 18, wherein said total bus width of said first, single logic staging is greater than said bus width of said subsequent, single logic staging.

20. A method for summing a column of binary bits, the steps comprising:
   a) providing a column of binary bits;
   b) converting said-column of binary bits into first states signals having predetermined number of bits, and first quotients;
   c) shifting said first state signals in a manner determined by said first state signal and said first quotients to produce output state signals having a predetermined number of bits smaller than said predetermined number of bits of said first state signals, and output quotients;
   d) repeating step (c) substituting said output state signals for said first state signals and said output quotients for said first quotients, each time producing new output state signals and new output quotients until said number of bits of said new output state signals is reduced to a predetermined value; and
   e) converting the final said new output state signals and the final said new output quotients into a number representative of the sum of said binary number.

21. A method for multiplying two numbers, the steps comprising:
   a) providing a partial product matrix representing said two numbers;
   b) selecting a row from said partial product matrix;
   c) converting said row into first state signals and first quotients;
   d) shifting said first state signals in a manner determined by said first state signals and said first quotients to produce (i) output state signals having a predetermined number of bits smaller than said predetermined number of bits of said first state signals, and (ii) output quotients having a predetermined number of bits smaller than the predetermined number of bits of said first quotients;

e) repeating step (d) and substituting said output state signals for said first state signals and said output quotients for said first quotients, each time producing new output state signals and new output quotients until said number of bits of said new output state signal is reduced to a predetermined value;

f) converting the final new output state signal and the final new output quotient into a result, said result comprising a carry generate bit and a carry propagate bit, said result being representative of said row of said partial product matrix;

g) performing steps (b) through (f) for each row of said partial product matrix; and h) combining each of said results representing said carry generate and carry propagate bits of each of said columns into a number representative of the product of said two numbers.

22. The method for multiplying two numbers as recited in claim 20, wherein each column of said partial product matrix is processed substantially simultaneously.

* * * * *